US012471131B2

(12) United States Patent
Elshafie et al.

(10) Patent No.: US 12,471,131 B2
(45) Date of Patent: Nov. 11, 2025

(54) SUPPORT OF LOW LATENCY TRANSMISSIONS IN SIDELINK

(71) Applicant: QUALCOMM Incorporated, San Diego, CA (US)

(72) Inventors: Ahmed Elshafie, San Diego, CA (US); Diana Maamari, San Diego, CA (US); Huilin Xu, Temecula, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 17/952,035

(22) Filed: Sep. 23, 2022

(65) Prior Publication Data
US 2024/0114541 A1     Apr. 4, 2024

(51) Int. Cl.
*G01R 31/08*     (2020.01)
*G06F 11/00*     (2006.01)
(Continued)

(52) U.S. Cl.
CPC ........ *H04W 72/542* (2023.01); *H04B 17/318* (2015.01); *H04W 72/20* (2023.01); *H04W 72/569* (2023.01)

(58) Field of Classification Search
CPC . H04W 72/542; H04W 72/20; H04W 72/569; H04W 76/14; H04W 76/28; H04W 72/40; H04B 17/318
See application file for complete search history.

(56) References Cited

U.S. PATENT DOCUMENTS 10,779,308 B2 *  9/2020  Patil .................. H04W 72/0473
10,880,897 B2 * 12/2020  Panteleev .............. H04W 4/46
(Continued)

FOREIGN PATENT DOCUMENTS

WO     WO-2019160788 A1     8/2019

OTHER PUBLICATIONS

Interdigital Inc: "Resource Pool Aspects for NR V2X", 3GPP TSG-RAN WG2 Meeting #107, R2-1909588 (R16 V2X WI A1144 Resource Pool Aspects), 3rd Generation Partnership Project, Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019, 5 Pages, XP051767383, Section 3, p. 3-4.
(Continued)

*Primary Examiner* — Stephen M D Agosta
(74) *Attorney, Agent, or Firm* — Holland & Hart LLP

(57) ABSTRACT

Methods, systems, and devices for wireless communications are described. Sidelink communications between user equipments (UE)s may include services that demand low latency and high reliability, such as extended reality (XR) and ultra-reliable low latency communications (URLLC). Given the latency demands for XR and URLLC, XR and URLLC may be higher priority than other communications types. A UE may determine that data for transmission over sidelink has a high priority level based on a remaining packet delay budget associated with the data. UEs may monitor for sidelink transmissions in accordance with network configured discontinuous reception (DRX) cycles. The DRX cycles configured by the network for sidelink communications, however, may not match with the periodicity of XR traffic. For XR communications, the transmitting UE may indicate an offset to apply to a DRX cycle such that the
(Continued)

receiving UE may adjust the DRX cycle to match the periodicity of the XR communications.

27 Claims, 16 Drawing Sheets

(51) Int. Cl.
| | | |
|---|---|---|
| *G08C 15/00* | (2006.01) | |
| *H04B 17/318* | (2015.01) | |
| *H04J 1/16* | (2006.01) | |
| *H04L 1/00* | (2006.01) | |
| *H04L 12/26* | (2006.01) | |
| *H04W 72/20* | (2023.01) | |
| *H04W 72/542* | (2023.01) | |
| *H04W 72/566* | (2023.01) | |

(56) References Cited

U.S. PATENT DOCUMENTS

| | | | | |
|---|---|---|---|---|
| 11,082,953 | B2* | 8/2021 | Wang | H04W 72/541 |
| 11,178,578 | B2* | 11/2021 | Huang | H04W 72/04 |
| 11,452,132 | B2 | 9/2022 | Stern-Berkowitz et al. | |
| 11,497,036 | B2* | 11/2022 | Xue | H04W 72/121 |
| 11,622,411 | B2* | 4/2023 | Narula | H04W 76/28 |
| | | | | 370/336 |
| 11,737,057 | B2* | 8/2023 | Ryu | H04W 72/1263 |
| | | | | 370/329 |
| 11,750,351 | B2* | 9/2023 | Taherzadeh Boroujeni | |
| | | | | H04L 1/0026 |
| | | | | 370/329 |
| 11,937,330 | B2* | 3/2024 | Li | H04W 76/23 |
| 12,058,767 | B2* | 8/2024 | Hosseini | H04W 4/40 |
| 12,068,820 | B2* | 8/2024 | Chae | H04B 7/06954 |
| 12,177,783 | B2* | 12/2024 | Ryu | H04W 72/20 |
| 12,225,618 | B2* | 2/2025 | Li | H04L 1/0025 |
| 12,336,042 | B2* | 6/2025 | Cheng | H04W 76/28 |
| 12,376,186 | B2* | 7/2025 | Wang | H04W 76/28 |
| 12,396,055 | B2* | 8/2025 | Wang | H04W 72/20 |
| 2018/0206260 | A1* | 7/2018 | Khoryaev | H04W 72/56 |
| 2019/0363843 | A1* | 11/2019 | Gordaychik | H04W 72/044 |
| 2020/0169950 | A1* | 5/2020 | Jung | H04B 7/0413 |
| 2020/0383088 | A1* | 12/2020 | Min | H04W 72/0446 |
| 2020/0396687 | A1* | 12/2020 | Hwang | H04W 68/025 |
| 2021/0067281 | A1* | 3/2021 | Sarkis | H04L 1/1887 |
| 2021/0067303 | A1* | 3/2021 | Taherzadeh Boroujeni | |
| | | | | H04W 76/14 |
| 2021/0105055 | A1* | 4/2021 | Chae | H04L 5/0057 |
| 2021/0144570 | A1* | 5/2021 | Chae | H04W 72/02 |
| 2021/0144582 | A1* | 5/2021 | Yi | H04W 72/23 |
| 2021/0176734 | A1* | 6/2021 | You | H04W 40/22 |
| 2021/0243836 | A1* | 8/2021 | Wu | H04W 76/14 |
| 2021/0266951 | A1* | 8/2021 | Gulati | H04B 17/318 |
| 2021/0337423 | A1* | 10/2021 | Ali | H04W 4/40 |
| 2021/0345145 | A1* | 11/2021 | Sarkis | H04W 24/10 |
| 2021/0385822 | A1* | 12/2021 | Chae | H04W 72/02 |
| 2021/0409990 | A1* | 12/2021 | Wang | H04W 24/08 |
| 2022/0053340 | A1* | 2/2022 | Ryu | H04W 76/28 |
| 2022/0060929 | A1* | 2/2022 | Hassan | H04W 72/02 |
| 2022/0070779 | A1* | 3/2022 | Li | H04W 76/14 |
| 2022/0070921 | A1* | 3/2022 | Xue | H04W 72/044 |
| 2022/0070965 | A1* | 3/2022 | Li | H04W 28/24 |
| 2022/0086803 | A1* | 3/2022 | Li | H04W 72/0446 |
| 2022/0095171 | A1* | 3/2022 | Hosseini | H04W 72/02 |
| 2022/0095349 | A1* | 3/2022 | Hosseini | H04W 76/14 |
| 2022/0116946 | A1* | 4/2022 | Yang | H04L 1/1864 |
| 2022/0132484 | A1* | 4/2022 | Hosseini | H04W 72/20 |
| 2022/0225290 | A1* | 7/2022 | Ganesan | H04W 72/02 |
| 2022/0312326 | A1* | 9/2022 | Wu | H04W 76/28 |
| 2022/0353945 | A1* | 11/2022 | Liu | H04W 76/28 |
| 2022/0361280 | A1* | 11/2022 | Cheng | H04W 76/28 |
| 2022/0369144 | A1* | 11/2022 | Lee | H04W 72/02 |
| 2022/0369187 | A1* | 11/2022 | Ganesan | H04W 36/06 |
| 2022/0394560 | A1* | 12/2022 | Yu | H04W 72/0446 |
| 2023/0036146 | A1* | 2/2023 | Xue | H04W 72/25 |
| 2023/0063472 | A1* | 3/2023 | Freda | H04W 52/0274 |
| 2023/0164872 | A1* | 5/2023 | Wang | H04W 4/12 |
| | | | | 370/329 |
| 2023/0199910 | A1* | 6/2023 | Balasubramanian | |
| | | | | H04W 76/28 |
| | | | | 370/328 |
| 2023/0262832 | A1* | 8/2023 | Wang | H04W 76/28 |
| | | | | 370/328 |
| 2023/0284331 | A1* | 9/2023 | Pradas | H04W 76/28 |
| | | | | 370/329 |
| 2023/0354228 | A1* | 11/2023 | Kim | H04W 56/0015 |
| 2024/0196262 | A1* | 6/2024 | Teyeb | H04W 72/02 |
| 2024/0215106 | A1* | 6/2024 | Elazzouni | H04L 5/0005 |
| 2024/0349397 | A1* | 10/2024 | Wu | H04W 76/28 |

OTHER PUBLICATIONS

International Search Report and Written Opinion—PCT/US2023/072717—ISA/EPO—Nov. 21, 2023 (2205363WO).

* cited by examiner 405-a 405-b

PSCCH Symbol 415   AGC Symbol 410

PSSCH Symbol 420

Gap Symbol 425

PSFCH Symbol 430

PSCCH Symbol 415-b

PSSCH Symbol 420-b   AGC Symbol 410-b

Gap Symbol 425-b

SUPPORT OF LOW LATENCY TRANSMISSIONS IN SIDELINK

FIELD OF TECHNOLOGY

The following relates to wireless communications, including support of low latency transmissions in sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support low latency transmissions in sidelink. For example, the described techniques provide for management of resource pools for low latency communications over sidelink. Sidelink communications between user equipments (UE)s may include services that demand low latency and high reliability, such as extended reality (XR) and ultra-reliable low latency communications (URLLC). In sidelink communications, a user equipment (UE) may be configured by higher layers with resource pools for sidelink communications. Given the latency demands for XR and URLLC, XR and URLLC may be higher priority than other communications types. A UE may determine that data for transmission over sidelink has a high priority level based on a remaining packet delay budget associated with the data. The UE may indicate in a sidelink control information (SCI) message that reserves a resource pool for transmission of the data that the data has a high priority level. The high priority level indicated in the SCI may preempt other reservations of the resource pool. In some examples, the network may indicate to a UE that some resource pools or sub resource pools are reserved for low latency traffic such as XR or URLLC, and the UE may select the resource pool based on the indication from the network entity.

Additionally, UEs may monitor for sidelink transmissions in accordance with network configured discontinuous reception (DRX) cycles. The DRX cycles configured by the network for sidelink communications, however, may not match with the periodicity of XR traffic. A mismatch between the DRX cycle and the periodicity of XR traffic may cause jitter at the receiving UE or missed reception of an XR transmission. Accordingly, for an XR communication, the transmitting UE may indicate an offset to apply to a DRX cycle such that the receiving UE may adjust the DRX cycle to match the periodicity of the XR communications.

DETAILED DESCRIPTION

Some wireless communications systems support sidelink communications between user equipments (UE)s. Sidelink communications may include services that demand low latency and high reliability, such as extended reality (XR) and ultra-reliable low latency communications (URLLC). In sidelink communications, a UE may be configured by higher layers with resource pools for sidelink communications. In sidelink mode 1, a network entity schedules resources (e.g., resource pools) for sidelink transmissions. In sidelink mode 2, the UEs autonomously select sidelink resources from the configured resource pools, based on reference signal received power (RSRP) measurements for the different resource pools. Given the latency requirements for XR and URLLC, XR and URLLC may be higher priority than other communications types. Additionally, UEs may monitor for sidelink transmissions in accordance with network configured discontinuous reception (DRX) cycles. The DRX cycles configured by the network, however, may not match with the periodicity of XR traffic. For example, XR traffic may have a period of 60 frames per second, which equates to a non-integer 16.67 ms period. A mismatch between the DRX cycle and the periodicity of XR traffic may cause jitter at the receiving UE or missed reception of an XR transmission.

A UE may determine that data for transmission over sidelink has a high priority level based on a remaining packet delay budget associated with the data. The UE may indicate in a sidelink control information (SCI) message that reserves a resource pool for transmission of the data that the data has a high priority level. The high priority level indicated in the SCI may preempt other reservations of the resource pool. In some examples, the network may indicate to a UE that some resource pools or sub resource pools are reserved for low latency traffic such as XR or URLLC, and the UE may select the resource pool based on the indication from the network entity. For an XR communication, the UE may indicate an offset to apply to a DRX cycle such that the receiving UE may adjust the DRX cycle to match the periodicity of the XR communications. For mode 2 communications, different RSRP thresholds may be configured for selecting resource pools for XR and URLLC to account for higher reliability and latency demands associated with XR and URLLC.

Aspects of the disclosure are initially described in the context of wireless communications systems. Aspects of the disclosure are further illustrated by and described with reference to timing diagrams, resource pools, slot formats, and process flows. Aspects of the disclosure are further illustrated by and described with reference to apparatus diagrams, system diagrams, and flowcharts that relate to support of low latency transmissions in sidelink.

Figure 1:
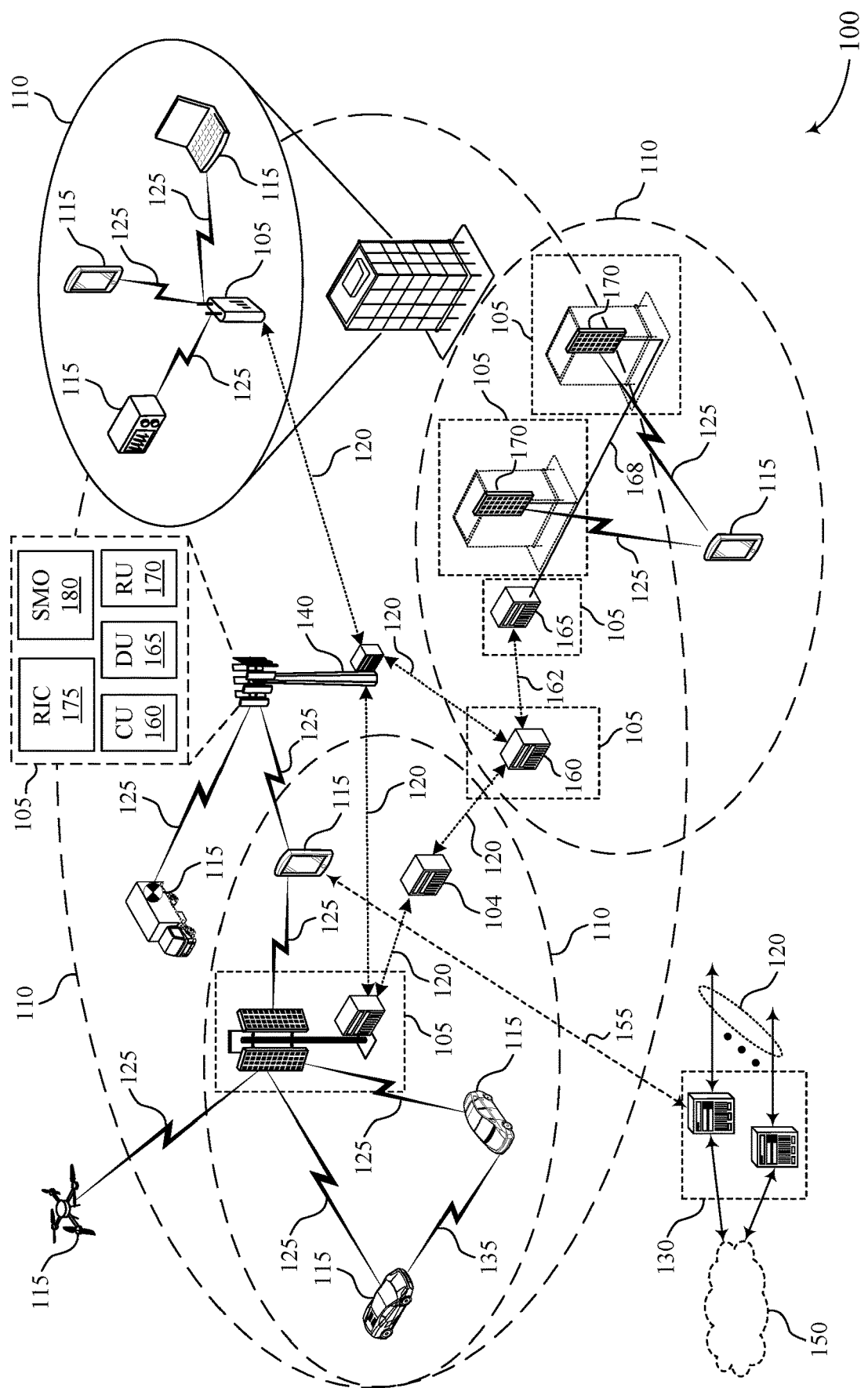
FIG. 1 illustrates an example of a wireless communications system that supports low latency transmissions in sidelink in accordance with one or more aspects of the present disclosure.

FIG. 1 illustrates an example of a wireless communications system 100 that supports low latency transmissions in sidelink in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support low latency transmissions in sidelink as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s$, $1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC. The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support multiple services, such as URLLC, XR, and industrial internet of things (IIOT), which may have a diverse set of latency and reliability requirements. For example, some applications may require a tighter latency and a more relaxed reliability. Some applications may have a stringent reliability requirement (e.g., 1e-6 block error ratio (BLER)) with a more relaxed latency. Some applications may have a stringent latency requirement (e.g., 1 ms) and a stringent reliability requirement (e.g., 1e-6 BLER). The wireless communications system 100 may include various features for supporting such applications, such as mini-slot scheduling, fast UE processing times, span-based physical downlink control channel (PDCCH), physical uplink shared channel (PUSCH) repetition with Type B, and multi-HARQ per slot.

Sidelink communications have expanded beyond V2X cases, such as for industrial (IIOT) and consumer use cases (e.g., smart wearables). Sidelink communications between UEs 115 may include services that demand low latency and high reliability, such as XR and URLLC. In sidelink communications, a UE may be configured by higher layers with resource pools for sidelink communications. In sidelink mode 1, a network entity 105 schedules resources (e.g., resource pools) for sidelink transmissions. In sidelink mode 2, the UEs 115 autonomously select sidelink resources from the configured resource pools, based on RSRP measurements for the different resource pools. Given the latency requirements for XR and URLLC, XR and URLLC may be higher priority than other sidelink communications types. A UE 115 may determine that data for transmission over sidelink has a high priority level based on a remaining packet delay budget associated with the data. The UE 115 may indicate in an SCI message that reserves a resource pool for transmission of the data that the data has a high priority level. The high priority level indicated in the SCI may preempt other reservations of the resource pool. In some examples, the network may indicate to a UE 115 that some resource pools or sub resource pools are reserved for low latency traffic such as XR or URLLC, and the UE 115 may select the resource pool based on the indication from the network entity.

Additionally, UEs 115 may monitor for sidelink transmissions in accordance with network configured DRX cycles. The DRX cycles configured by the network, however, may not match with the periodicity of XR traffic. For example, XR traffic may have a period of 60 frames per second, which equates to a non-integer 16.67 ms period. A mismatch between the DRX cycle and the periodicity of XR traffic may cause jitter at the receiving UE 115 or missed reception of an XR transmission. For an XR communication, the UE 115 may indicate an offset to apply to a DRX cycle such that the receiving UE may adjust the DRX cycle to match the periodicity of the XR communications. For mode 2 communications, different RSRP thresholds may be configured for selecting resource pools for XR and URLLC to account for higher reliability and latency demands associated with XR and URLLC.

Figure 2:
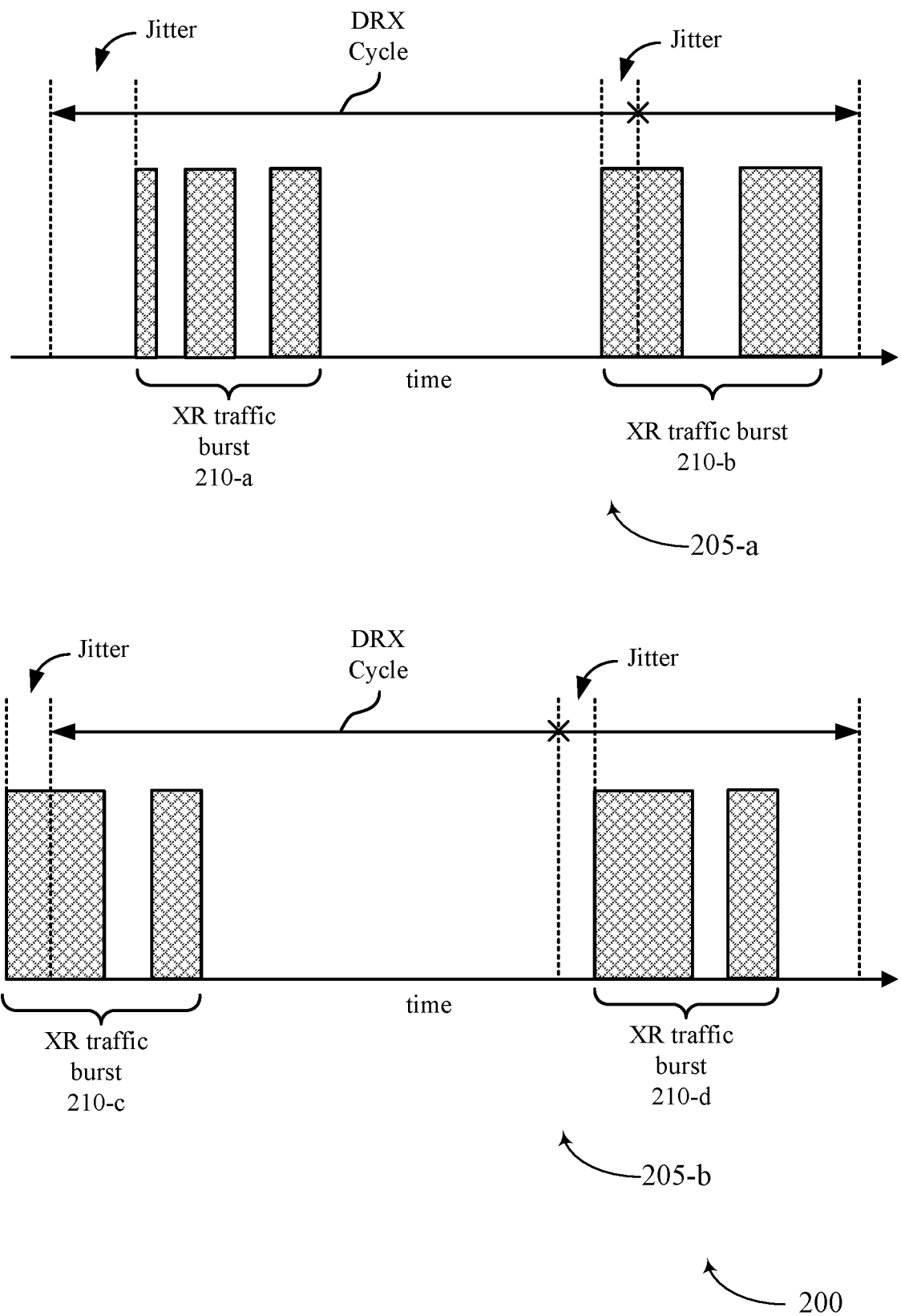
FIG. 2 illustrates an example of a timing diagram that supports low latency transmissions in sidelink in accordance with one or more aspects of the present disclosure.

FIG. 2 illustrates an example of a timing diagram 200 that supports low latency transmissions in sidelink in accordance with one or more aspects of the present disclosure. The timing diagram 200 may be implemented by aspects of the wireless communications system 100. For example, the timing diagram 200 may be implemented by one or more UEs 115.

FIG. 2 shows a first XR traffic flow 205-a and a second XR traffic flow 205-b. XR traffic may include variability in the number and size of packets per XR traffic burst. For example, for the first XR traffic flow 205-a, the first XR traffic burst 210-a includes 3 packets and the second XR traffic burst 210-b includes 2 packets. XR traffic may also include non-integer reception and transmission periods. For example, if XR traffic is transmitted at 60 frames per second, a period for the XR traffic (1/60) is 16.67 ms. As another example, if XR traffic is transmitted at 120 frames per second, a period for the XR traffic (1/120) is 8.33 ms.

Arrival times of XR traffic may vary, which may result in jitter, for example due to the XR traffic variation and the difference between a DRX cycle for sidelink, which may be integer based, and the non-integer period of XR traffic. Jitter may be approximately +/−4 ms. For example, in the first XR traffic flow 205-a, jitter may occur before the start of the first XR traffic burst 210-a and after the start of the second XR traffic burst 210-b. As another example, in the second XR traffic flow 205-b, jitter may occur after the start of the XR traffic burst 210-c and before the start of the second XR traffic burst 210-d.

Multiple flows of XR traffic may be configured with different transmission configurations (e.g., modulation and coding schemes (MCS)s, FPS). XR traffic may include a packet delay budget ($T_{wait}$). For example, in uplink and sidelink, the delay T at the air interface may be broken down into $T_{air}$ and $T_{wait}$. $T=T_{air}+T_{wait}$. $T_{wait}$ refers to the waiting time prior to transmission. When a service data unit (SDU) arrives in the Packet Data Convergence Protocol (PDCP) queue, the UE 115 stores the arrival time ($T_{arrival}$) of the SDU. When transmitting the first MAC packet data unit (PDU) from that SDU (at a time $T_{first}$), the UE waiting time of that SDU is given by $T_{wait}=T_{first}-T_{arrival}$. $T_{air}$ is the time difference from the first reception (even unsuccessful) of the MAC PDU that contains the MAC control element (MAC-CE) or buffer status report (BSR) to the successful reception of the last MAC PDU carrying data from that SDU. $T_{wait}$ accordingly equals the uplink or sidelink PDCP queuing delay (e.g., the delay from packet arrival at PDCP upper service access point (SAP) until the uplink or sidelink grant to transmit the packet is available, which has included the delay for the UE to get resources granted (e.g., from a scheduling request/RACH/SCI to get the first resource). The remaining packet delay budget accordingly refers to the packet delay budget minus the experienced uplink or sidelink delay.

Several power saving techniques, such as connected mode DRX (C-DRX) enhancement and PDCCH monitoring enhancement and may be used to accommodate XR service characteristics (e.g., periodicity, multiple flows, jitter, latency demands, reliability demands). Additionally, or alternatively, several techniques may be used to improve capacity of XR via more efficient resource allocation and scheduling for XR service characteristics (e.g., periodicity, multiple flows, jitter, latency demands, reliability demands). For example, semi-persistent scheduling and configured grant (CG) enhancements and dynamic scheduling/grant enhancements may allow for more efficient resource allocation and scheduling for XR service characteristics.

Figure 3:
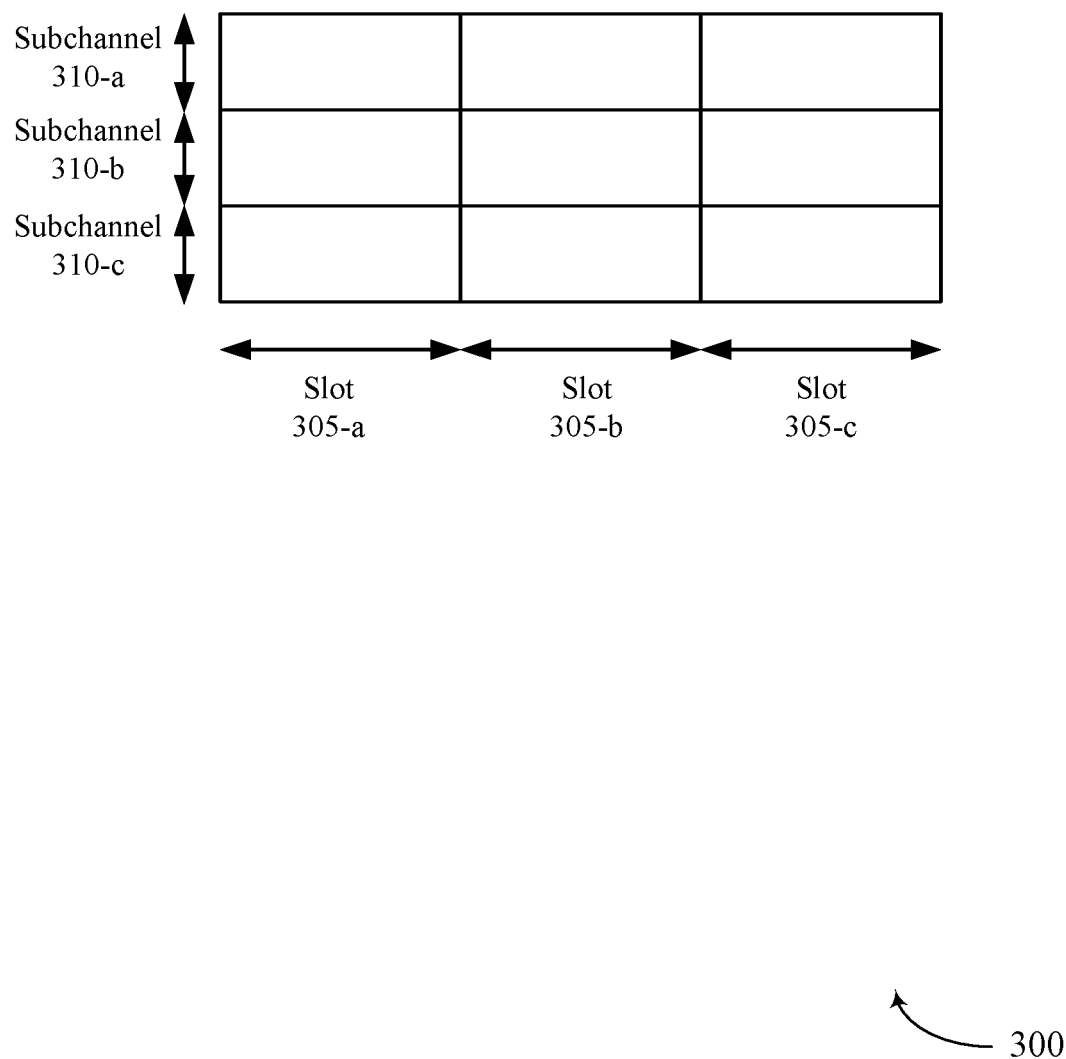
FIG. 3 illustrates an example of a resource pool that supports low latency transmissions in sidelink in accordance with one or more aspects of the present disclosure.

FIG. 3 illustrates an example of a resource pool 300 that supports low latency transmissions in sidelink in accordance with one or more aspects of the present disclosure. The resource pool 300 may be implemented by aspects of the wireless communications system 100.

Sidelink communications may be based on slot-based operation. Each semi-static uplink slot (or optionally the semi-static uplink portion of flexible slots) may be indicated for sidelink communication (e.g., instead of for uplink). The resource pool 300 illustrates a slot structure that includes a first slot 305-a, a second slot 305-b, and a third slot 305-c, as well as a first subchannel 310-a, a second subchannel 310-b, and a third subchannel 310-c. In the frequency domain, a set of contiguous resource blocks forms a subchannel, which may be the smallest transmission/reception unit.

A UE 115 may be configured by higher layers with one or more sidelink resource pools. A sidelink resource pool may be used for transmission of a physical sidelink shared channel (PSSCH) or for reception of a PSSCH and may be associated with either sidelink resource allocation mode 1 or sidelink resource allocation mode 2. In the frequency domain, a sidelink resource pool includes a quantity of contiguous subchannels (indicated by the information element sl-NumSubchannel in higher layers). For example, the resource pool 300 includes 3 subchannels (the first subchannel 310-a, the second subchannel 310-b, and the third subchannel 310-c). A subchannel includes a quantity of contiguous physical resource blocks (PRBs) (indicated by the information element sl-SubchannelSize in higher layers).

Figure 4:
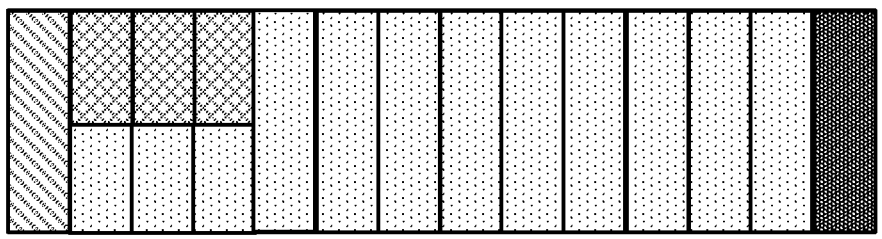
FIG. 4 illustrates an example of a slot format that supports low latency transmissions in sidelink in accordance with one or more aspects of the present disclosure.
Figure 4:
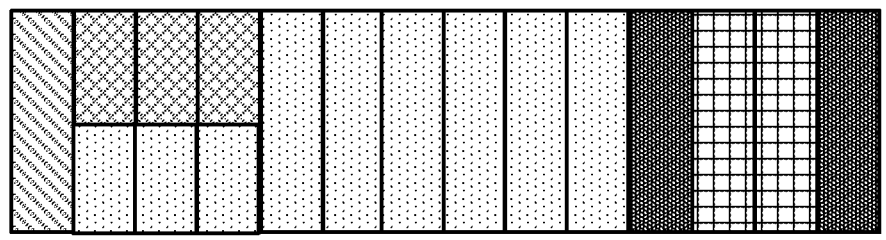
Figure 4:
Figure 4:
Figure 4:
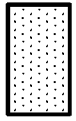
Figure 4:
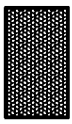
Figure 4:
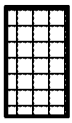

FIG. 4 illustrates an example of a slot format 400 that supports low latency transmissions in sidelink in accordance with one or more aspects of the present disclosure. The slot format 400 may be implemented by aspects of the wireless communications systems 100. For example, the slot format 400 may be implemented by one or more UEs 115.

Sidelink scheduling may be slot based. For example, a sidelink slot 405-a or a sidelink slot 405-b includes physical sidelink control channel (PSCCH) symbols 415 accompanied with PSSCH symbols 420 at the beginning of the slot followed by PSSCH symbols 420. In sidelink, each PSCCH schedules the PSSCH in the same slot, and may also reserve some slots in the future for retransmission of a same transport block (TB). A slot (sidelink slot 405-a or sidelink slot 405-b) may include an automatic gain control (AGC) symbol 410 at the beginning of the slot and a gap symbol 425 at the end of the slot. The automatic gain control symbol may be used to adjust gain control at the receiving UE 115.

The sidelink slot 405-b includes physical sidelink feedback channel (PSFCH) symbols 430 for HARQ feedback. Sidelink HARQ feedback may be slot based. PSFCH resources may be available at the end of some slots (e.g., the sidelink slot 405-b), and the PSFCH resources may be indicated by an offset and periodicity. The PSFCH periodicity for a resource pool may be set by higher layers (e.g., RRC) to be {0 (no PSFCH), 1, 2, or 4} (numbers counter in units of slots).

In some examples, for an initial transmission of a TB in a slot n, the PSFCH from the sidelink receiver UE 115 may be expected by the transmitting UE 115 (the UE that transmitted the TB) in a slot n+3 at the earliest time. Accordingly, a retransmission of the TB may occur in such examples at slot n+4 at the earliest time. Given a subcarrier spacing (SCS) of 30 kHz, the round trip time would be at least 2 ms. Unless the initial transmission is conservative (e.g., uses a low coding rate) or a blind repetition is implemented, URLLC applications with stringent requirements (e.g., 1 ms latency and 1e-6 BLER for HOT) may not be supported. Accordingly, a new sidelink structure may be devised to support applications such as XR and URLLC with high reliability and low latency requirements.

Figure 5:
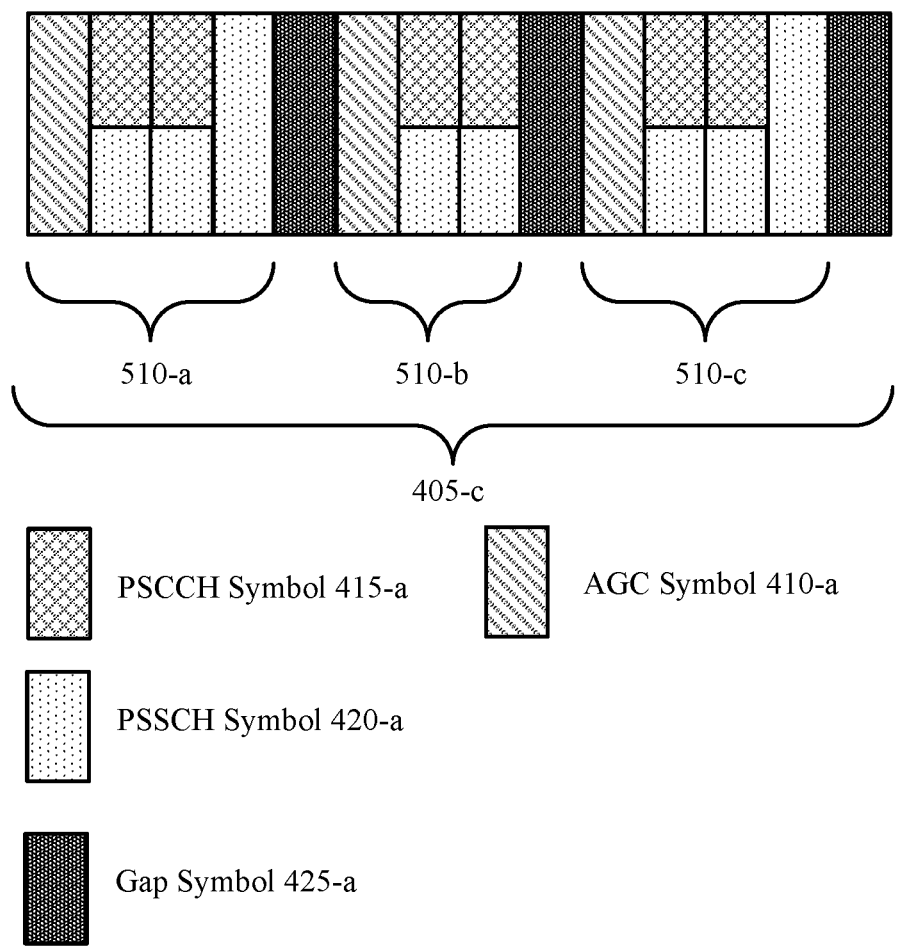
FIG. 5 illustrates an example of a slot format that supports low latency transmissions in sidelink in accordance with one or more aspects of the present disclosure.

FIG. 5 illustrates an example of a slot format 500 that supports low latency transmissions in sidelink in accordance with one or more aspects of the present disclosure. The slot format 500 may be implemented by aspects of the wireless communications systems 100. For example, the slot format 500 may be implemented by one or more UEs 115.

Some wireless communications systems may implement mini-slot scheduling to reduce scheduling and turn-around time for sidelink communications. For example, a mini-slot may include less than the 14 OFDM symbols included in a normal length slot. A slot 405-c may be split into multiple mini or subslots (e.g., the first mini-slot 510-a, the second mini-slot 510-b, and the third mini-slot 510-c). Each mini-slot includes PSCCH symbols 415-a and PSSCH symbols 420-a and may be self-schedulable and decodable. A gap symbol 425-a may separate the mini-slots (the first mini-slot 510-a, the second mini-slot 510-b, and the third mini-slot 510-c). In some examples, each mini-slot includes an AGC symbol 410-a. In some examples, an AGC symbol 410-a in the first mini-slot 510-a may be applied to each mini-slot (e.g., the second mini-slot 510-b and the third mini-slot 510-c may omit an AGC symbol).

With mini-slot scheduling, each UE 115 may select and reserve one or multiple mini-slots slots (e.g., the first mini-slot 510-a, the second mini-slot 510-b, and the third mini-slot 510-c) per slot 405-c.

As the number of mini-slots or sub-slots increases per slot (which enhances scheduling latency and is suitable for small packets (e.g., 32 bits for HOT)), more symbols may be allocated to gaps (e.g., gap symbols 425-a). For some cases (e.g., if a large number of UEs are supported), such gap overhead may degrade latency reduction gains associated with mini-slot scheduling.

Figure 6:
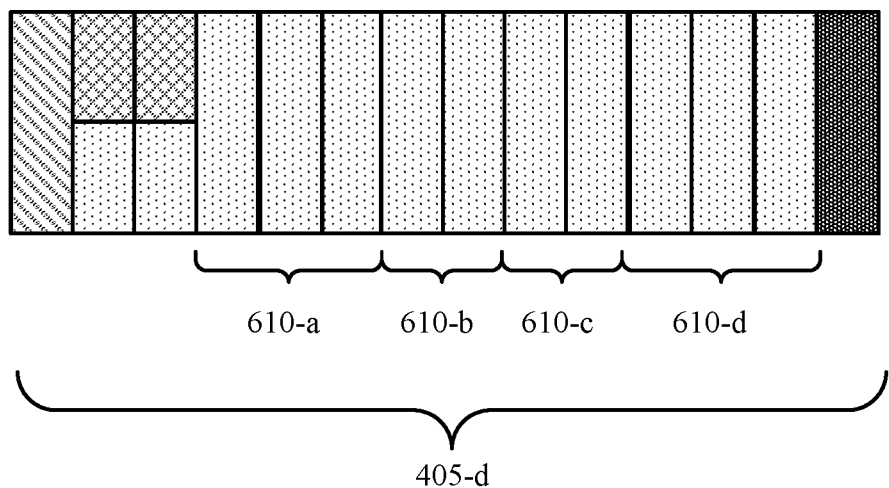
FIG. 6 illustrates an example of a slot format that supports low latency transmissions in sidelink in accordance with one or more aspects of the present disclosure.
Figure 6:
Figure 6:
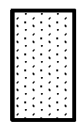
Figure 6:
Figure 6:
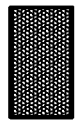

FIG. 6 illustrates an example of a slot format 600 that supports low latency transmissions in sidelink in accordance with one or more aspects of the present disclosure. The slot format 600 may be implemented by aspects of the wireless communications systems 100. For example, the slot format 600 may be implemented by one or more UEs 115.

Gap symbols (e.g., gap symbols 425-a in FIG. 5) are used for transmit/receive switching. In cases where transmit/receive switching only occurs at slot boundaries, gaps symbols 425-b may be used only at the end of the slot.

For example, slot 405-d illustrates a slot split into multiple sub-slots (the first sub-slot 610-a, the second sub-slot 610-b, the third sub-slot 610-c, and the fourth sub-slot 610-d). Each sub-slot (the first sub-slot 610-a, the second sub-slot 610-b, the third sub-slot 610-c, and the fourth sub-slot 610-d) includes PSSCH symbols 420-b. PSCCH symbols 415-b may only be at the beginning of the slot 405-d. SCI in the PSCCH symbols 415-b may indicate a transmission or reservation of a number of subslots in the same slot (e.g., the slot 405-d) or a future slot. AGC symbols may not be needed in each sub slot (e.g., the first sub-slot 610-a, the second sub-slot 610-b, the third sub-slot 610-c, and the fourth sub-slot 610-d), as a receiving UE may set the AGC based on the AGC symbol 410-b at the beginning of the slot 405-d and may use the same AGC setting for any of the PSSCH symbols 420-b in the slot 405-d.

Figure 7:
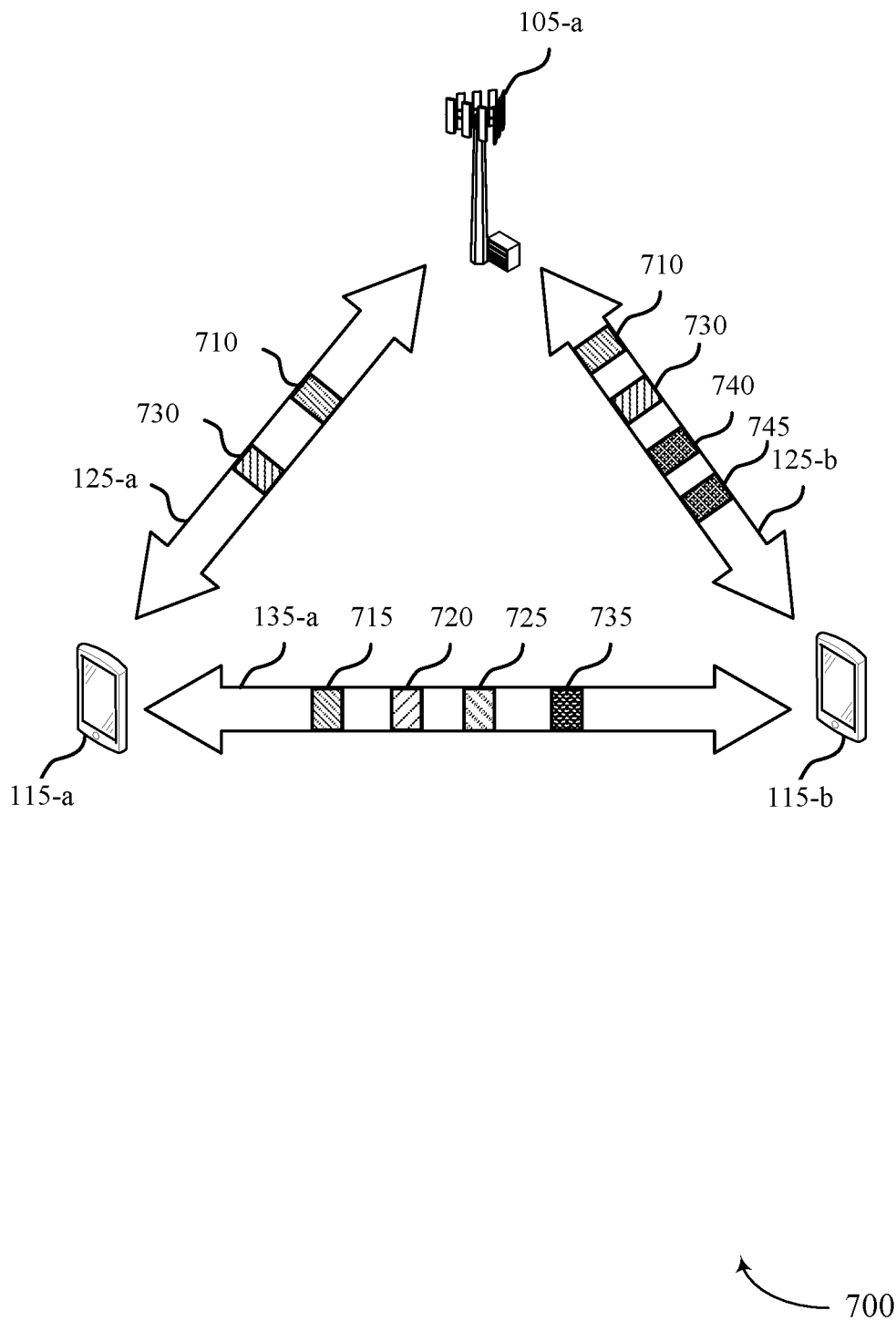
FIG. 7 illustrates an example of a wireless communications system that supports low latency transmissions in sidelink in accordance with one or more aspects of the present disclosure.

FIG. 7 illustrates an example of a wireless communications system 700 that supports low latency transmissions in sidelink in accordance with one or more aspects of the present disclosure. The wireless communications system 700 may include a first UE 115-a and a second UE 115-b, which may be examples of a UE 115 as described herein. The wireless communications system 700 may include a network entity 105-a, which may be an example of a network entity 105 as described herein.

The first UE 115-a may communicate with the network entity 105-a using a communication link 125-a, which may be an example of an NR or LTE link between the first UE 115-a and the network entity 105-a. The second UE 115-b may communicate with the network entity 105-a using a communication link 125-b, which may be an example of an NR or LTE link between the second UE 115-b and the network entity 105-a. The communication link 125-a and the communication link 125-b may include bi-directional links that enables both uplink and downlink communication. For example, the first UE 115-a may transmit uplink transmissions, such as uplink control signals or uplink data signals, to the network entity 105-a using the communication link 125-a and the network entity 105-a may transmit downlink transmissions, such as downlink control signals or downlink data signals, to the first UE 115-a using the communication link 125-a. The second UE 115-b may transmit uplink transmissions, such as uplink control signals or uplink data signals, to the network entity 105-a using the communication link 125-b and the network entity 105-a may transmit downlink transmissions, such as downlink control signals or downlink data signals, to the second UE 115-b using the communication link 125-b.

The first UE 115-a may communicate with the second UE 115-b using a sidelink communication link 135-a. The sidelink communication link 135-a may include bi-directional links that enable the first UE 115-a and the second UE 115-b to transmit and receive sidelink signals. In some examples (e.g., in Mode 1), the network (e.g., the network entity 105-a) may configure resources for the sidelink communication link 135-a. In some examples, the first UE 115-a and the second UE 115-b may communicate over the sidelink communication link 135-a using directional communications techniques (e.g., beamforming techniques). In some examples (e.g., in Mode 2), the first UE 115-a and the second UE 115-b may determine and configure the resources for the sidelink communication link 135-a autonomously (e.g., without involvement from the network entity 105-a).

The network entity 105-a may transmit control signaling 710 (e.g., RRC signaling) indicating a set of resource pools available for sidelink communications. The first UE 115-a may transmit an SCI 715 indicating a reservation of a resource pool of the set of resource pools. The SCI 715 indicates a priority level associated with low latency data. The priority level may be based on a delay budget (e.g., a remaining packet delay budget) associated with the low latency data. The priority indicated in the SCI may be indicated via three or more bits, and may be a function of the packet delay budget (and any other application requirements). In some examples, the priority may be indicated in an SCI-1 message or an SCI-2 message. A first-stage SCI message refers to an SCI message conveyed via a PSCCH, and may be referred to as an SCI-1. A second stage SCI refers to an SCI message conveyed via PSSCH, and may be referred to as an SCI-2. The first UE 115-a may transmit, to the second UE 115-b, a sidelink message 720 including the low latency data.

In some examples, the low latency data may be XR traffic. In some examples, if other traffic is allowed on the same resource pools with XR, XR may preempt other traffic. XR preemption may apply to old transmissions (e.g., similarly to downlink preemption where what a UE 115 already received may be removed for other services) or future transmissions (e.g., canceling future allocations to transmit/receive XR).

If the priority in SCI-1 or SCI-2 (e.g., in the SCI 715) indicates a high priority based on the remaining packet delay budget, other UEs (e.g., the second UE 115-b) may refrain from using the indicated slots/subslots. An XR traffic indication in an SCI 715 may also reserve future slots without allowing other traffic type (e.g., eMBB). In some cases, URLLC traffic may be allowed with XR traffic (e.g., due to delay of a URLLC packet relative to XR). For example, there may be a threshold delay where URLLC is given priority over XR. The priority indication may be indicated via K additional bits (e.g., in addition to 3 bits) for different traffic types or priority of traffic based on a delay budget. The priority indication may assist intra-mux prioritization. The priority indication may assist the first UE 115-*a* to preempt another reservation (e.g., another reservation transmitted via a second SCI 725).

A sidelink DRX configuration (including the periodicity and the start or start and end of the DRX active time) may not match the XR quasi periodic traffic (e.g., at 60 fps or 30 fps). For example, in XR traffic, a packet arrives every 16.67 ms for 60 fps, which may not align with an integer periodicity for sidelink. Packets arriving at a non-integer rate (e.g., every 16.67 ms for 60 fps) may not fall into the "on" duration of a receiving UE's (e.g., the second UE 115-*b*) sidelink DRX cycle. To avoid data loss and/or jitter, the non-integer periodicity of XR traffic should match sidelink DRX configuration. In some examples, a sidelink DRX configuration may be selected to match the XR traffic, for example by adding offsets to the beginning of a sidelink DRX cycle or using unequal DRX cycles. For example, additional offsets may be indicated via a control message 730 from the network entity 105-*a* (layer 1, layer 2, or layer 3 signaling), a control message 735 from the transmitting UE (the first UE115-*a*) (layer 1, layer 2, or layer 3 signaling), or via adjustments to a DRX cycle via a wake up signal 740.

In some examples, the network entity 105-*a* may configure a DRX cycle for XR traffic based on the XR traffic. The network entity 105-*a* may indicate the DRX cycle to the first UE 115-*a* via a control message 730, and the first UE 115-*a* may indicate the DRX cycle to the second UE 115-*b* via a control message 735. In some examples, the first UE 115-*a* may configure the DRX cycle for the second UE 115-*b* based on XR traffic and statistics, and the first UE 115-*a* may indicate the DRX cycle to the second UE 115-*b* via a control message 735. In some examples, the first UE 115-*a* may suggest to the second UE 115-*b* to configure a DRX cycle for XR traffic via a control message 735, and the second UE 115-*b* may configure a DRX cycle for XR traffic based on XR traffic and statistics. In some examples, the first UE 115-*a* may suggest to the second UE 115-*b* to configure a DRX cycle for XR traffic via a control message 735. The second UE 115-*b* may relay the suggestion to the network entity 105-*a* via a control message 745, and the network entity 105-*a* may configure and indicate (via a control message 730) a DRX cycle for XR traffic based on XR traffic and statistics. A sidelink DRX cycle may be enhanced to match the XR periodic traffic through dynamic signaling, configuring multiple sidelink DRX configurations, or configuring a cycle pattern of DRX to match the non-integer periodicity of XR traffic. Enhancements for DRX to match XR traffic in Uu link may be applied to sidelink communications over the sidelink communication link 135-*a*. Additionally, or alternatively, periodicities of periodic configurations such as CGs, scheduling requests, and sounding reference signals may be configured to match the periodicity of XR traffic.

In sidelink, UEs (e.g., the first UE 115-*a* and the second UE 115-*b*) may sense a channel by decoding SCIs and determining the demodulation reference signal (DMRS) location for PSSCH (data). Based on the PSCCH DRMS or PSSCH DMRS (based on the sidelink mode), the UE (e.g., the first UE 115-*a* and/or the second UE 115-*b*) determines, based on an RSRP measurement and a configured RSRP threshold (that may be RRC configured), whether the future retransmissions of a TB are used/reserved. In some examples, RSRP thresholds for XR services may be increased or defined specifically for XR traffic. For example, when a second UE 115-*b* determines that traffic (e.g., based on a traffic priority indication in the SCI 715) of the transmitting UE (the first UE 115-*a*) is XR traffic, the second UE 115-*b* may use a higher RSRP threshold. For example, the RSRP threshold may be a function of current transmitting UE (the first UE 115-*a*) traffic and the traffic of the resource sensing UE (the second UE 115-*b*). The RSRP deltas (increases for XR traffic) may be indicated in control signaling 710 from the network entity 105-*a* that configures the set of resource pools. In some cases, the RSRP deltas may controlled by a controlling unit in sidelink (e.g., a programmable logic controller or a primary UE (e.g., one of the first UE 115-*a* or the second UE 115-*b*)).

In some cases, the first UE 115-*a* and the second UE 115-*b*, while sharing RSRP thresholds during an RRC connection, may define new RSRP thresholds as a function of traffic type (or a traffic priority indication type). UEs sensing a channel (e.g., the first UE 115-*a* or the second UE 115-*b*) may avoid resources that will possibly be contention based when the UEs are scheduling XR traffic or URLLC traffic.

In some examples, some configured grants may be configured by layer 3 signaling (RRC) or layer 2 signaling (e.g., a MAC control element (MAC-CE)) for some traffic, such as URLLC and/or XR, such that URLLC and or XR may be indicated as high priority traffic. For example, the configured grants may be configured by the control signaling 710 or the control message 730.

In some examples, the network entity 105-*a* may reserve (e.g., via the control signaling 710), a resource pool for XR during a given time interval, for example, based on XR traffic arrivals for UEs 115 (e.g., most of the UEs 115) using a resource pool. In some examples, a resource pool may be split into sub resource pools, where XR traffic may use a specific sub resource pool. The control signaling 710 may indicate the sub resource pool for XR traffic. In some examples, each sub resource pool may have a different DRX configuration so that the DRX configuration for the sub resource pool for XR traffic may match the XR traffic periodicity. The control signaling 710 may indicate the DRX configuration for each sub resource pool.

In some examples, XR data transmissions may be repeated across sub resource pools. In some examples, multiple sub-slots may be defined for XR traffic (e.g., via control signaling 710), and a transmitting UE (e.g., the first UE 115-*a*) may repeat XR data transmissions over more than one sub-slot. In some examples, a default repetition (e.g., Xrepetitions configured using layer 1, layer 2, or layer 3 signaling, configured per resource pool, or configured per sub resource pool) of each TB may occur within a slot or across slots.

In some cases, any UE (e.g., the first UE 115-*a* or the second UE 115-*b*) may indicate a resource pool or a sub resource pool to be used for XR traffic or for high reliability transmissions. In some cases, a sidelink message 720 may be repeated across multiple sub resource pools or resource pools at the same time or across times (e.g., redundancy version (RV) 0 and RV1 of a TB may be transmitted within a slot across two mini-slots or across sub resource pools on a same mini-slot or different mini-slots).

Figure 8:
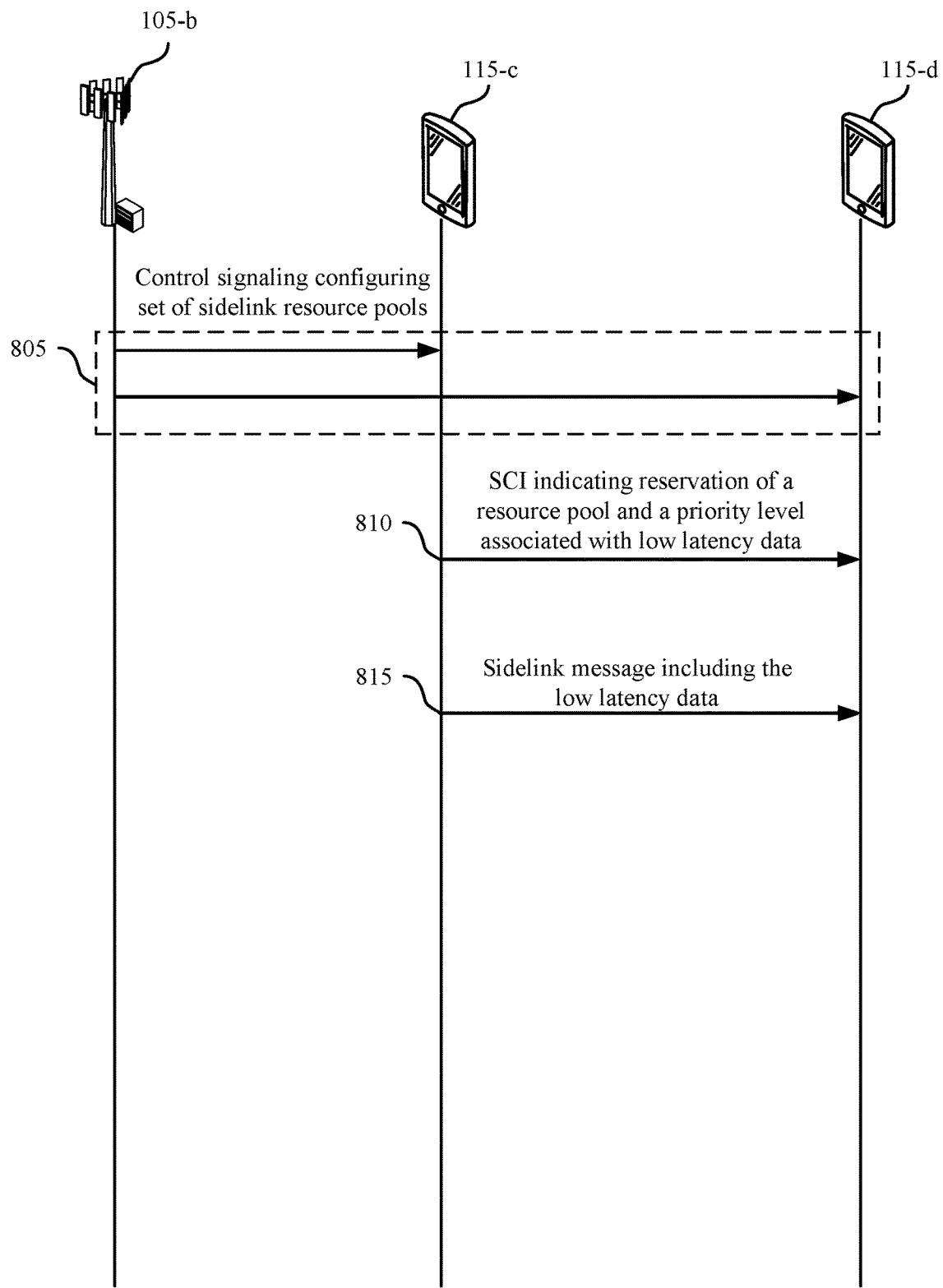
FIG. 8 illustrates an example of a process flow that supports low latency transmissions in sidelink in accordance with one or more aspects of the present disclosure.

FIG. 8 illustrates an example of a process flow 800 that supports low latency transmissions in sidelink in accordance with one or more aspects of the present disclosure. The process flow 800 may include a first UE 115-*c* and a second UE 115-*d*, which may be examples of a UE 115 as described herein. The process flow 800 may include a network entity 105-*b*, which may be an example of a network entity 105 as described herein. In the following description of the process flow 800, the operations between the network entity 105-*b*, first UE 115-c, and the second UE 115-d may be transmitted in a different order than the example order shown, or the operations performed by the network entity 105-b, first UE 115-c, and the second UE 115-d may be performed in different orders or at different times. Some operations may also be omitted from the process flow 800, and other operations may be added to the process flow 800.

At 805, the first UE 115-c and the second UE 115-d may receive control signaling indicating a set of resource pools available for sidelink communications. In some cases, the network entity 105-b may transmit the control signaling at 805.

At 810, the first UE 115-c may transmit, and the second UE 115-d may receive, an SCI message indicating a reservation of a resource pool of the set of resource pools, where the reservation indicates a priority level associated with low latency data, and where the priority level is based on a delay budget associated with the low latency data.

At 815, the first UE 115-c may transmit, to the second UE 115-d via the resource pool, a sidelink message including the low latency data.

In some examples, the first UE 115-c may receive, from a third UE and prior to transmitting the SCI message at 810, second control signaling indicating a second reservation of the resource pool, where the second reservation indicates a second priority level lower that the priority level. Transmitting the SCI message at 810 is based on the second priority level being lower than the priority level. In some examples, the second UE 115-b may receive, from a third UE and prior to receiving the SCI message at 810, second control signaling indicating a second reservation of the resource pool, where the second reservation indicates a second priority level lower that the priority level, and receiving the SCI message is based on the second priority level being lower than the priority level.

In some examples, the first UE 115-c may transmit, to the second UE 115-d, second control signaling indicating an offset to apply to a DRX cycle for XR traffic, and the low latency data is XR traffic. In some examples, the first UE 115-c may receive, from the network entity 105-b, an indication of the offset.

In some examples, the second UE 115-d may receive (e.g., from the network entity 105-b) second control signaling an indication of an offset to apply to a DRX cycle for XR traffic, and the low latency data is XR traffic.

In some examples, the first UE 115-c may receive (e.g., from the network entity 105-b) second control signaling indicating a RSRP threshold associated with low latency traffic. The first UE 115-c may measure RSRPs of reference signals associated with resource pools of the set of resource pools. The first UE 115-c may select the resource pool based on a measured RSRP of a reference signal associated with the resource pool satisfying the RSRP threshold associated with low latency traffic.

In some examples, the first UE 115-c may transmit, to the second UE 115-d, second control signaling indicating a RSRP threshold associated with low latency traffic.

In some examples, the first UE 115-c may receive (e.g., from the network entity 105-b) second control signaling indicating a subset of the set of resource pools associated with configured grants for low latency traffic. The first UE 115-c may communicate low latency traffic via the subset with the second UE 115-d. In some examples, the second UE 115-d may receive (e.g., from the network entity 105-b) the second control signaling indicating the subset of the set of resource pools associated with configured grants for low latency traffic.

In some examples, the first UE 115-c and/or the second UE 115-d may receive, from the network entity 105-b, an indication that the resource pool is associated with low latency traffic during a time interval, and the sidelink message is transmitted at 815 during the time interval.

In some examples, the first UE 115-c may receive, with the control signaling at 805, an indication of a sub resource pool of the resource pool associated with XR traffic and a DRX cycle associated with the sub resource pool.

In some examples, the first UE 115-c may repeat transmission of the sidelink message via a set of multiple sub resource pools of the resource pool.

In some examples, the first UE 115-c and/or the second UE 115-d may receive (e.g., from the network entity 105-b) second control signaling indicating a repetition pattern for low latency traffic across subslots, and transmitting the sidelink message at 815 may include repeating transmission of the sidelink message across a set of subslots of the resource pool.

In some examples, the first UE 115-c may receive, from the second UE 115-d or a third UE, second control signaling indicating that the resource pool is associated with low latency traffic, and transmitting the SCI message is based on the second control signaling.

In some examples, the first UE 115-c may repeat transmission of the sidelink message across multiple resource pools of the set of resource pools, and the SCI message at 810 indicates a second reservation of the multiple resource pools.

Figure 9:
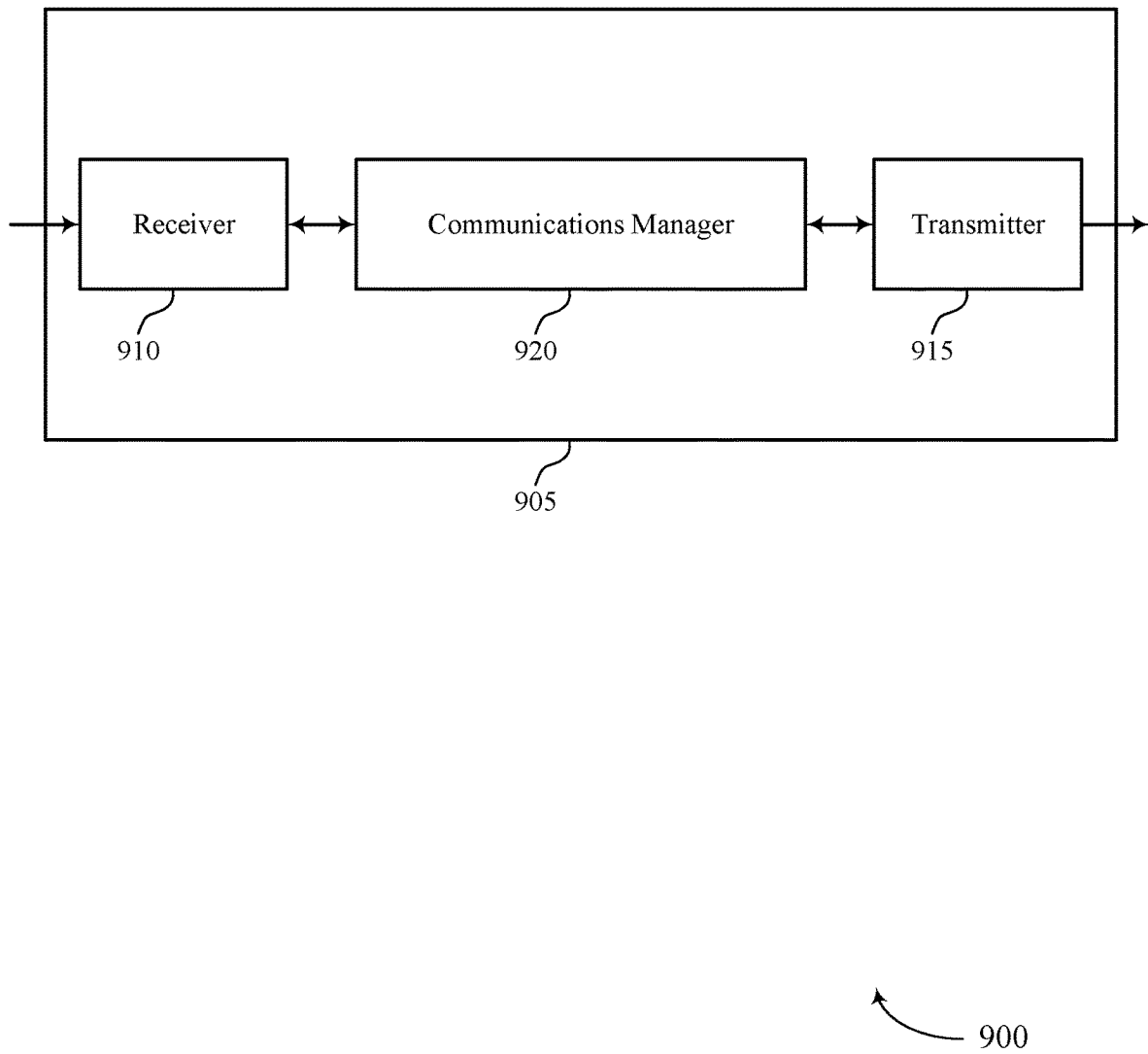
FIGS. 9 and 10 show block diagrams of devices that support low latency transmissions in sidelink in accordance with one or more aspects of the present disclosure.

FIG. 9 shows a block diagram 900 of a device 905 that supports low latency transmissions in sidelink in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to support of low latency transmissions in sidelink). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to support of low latency transmissions in sidelink). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of support of low latency transmissions in sidelink as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first UE in accordance with examples as disclosed herein. For example, the communications manager 920 may be configured as or otherwise support a means for receiving control signaling indicating a set of resource pools available for sidelink communications. The communications manager 920 may be configured as or otherwise support a means for transmitting an SCI message indicating a reservation of a resource pool of the set of resource pools, where the reservation indicates a priority level associated with low latency data, and where the priority level is based on a delay budget associated with the low latency data. The communications manager 920 may be configured as or otherwise support a means for transmitting, to a second UE via the resource pool, a sidelink message including the low latency data.

Additionally, or alternatively, the communications manager 920 may support wireless communications at a second UE in accordance with examples as disclosed herein. For example, the communications manager 920 may be configured as or otherwise support a means for receiving control signaling indicating a set of resource pools available for sidelink communications. The communications manager 920 may be configured as or otherwise support a means for receiving, from a first UE, an SCI message indicating a reservation of a resource pool of the set of resource pools, where the reservation indicates a priority level associated with low latency data, and where the priority level is based on a delay budget associated with the low latency data. The communications manager 920 may be configured as or otherwise support a means for transmitting, from the first UE via the resource pool, a sidelink message including the low latency data.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources.

Figure 10:
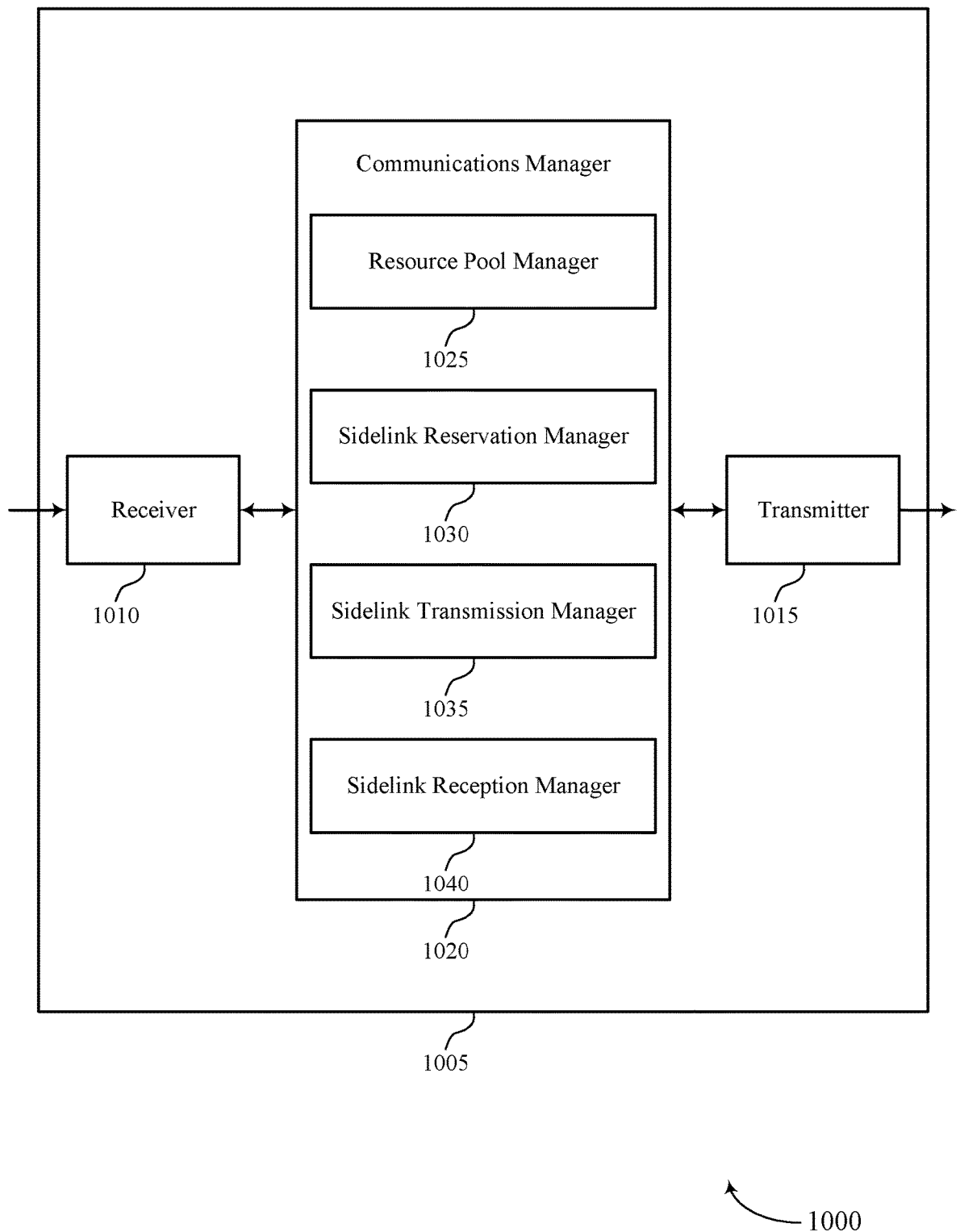

FIG. 10 shows a block diagram 1000 of a device 1005 that supports low latency transmissions in sidelink in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to support of low latency transmissions in sidelink). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to support of low latency transmissions in sidelink). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of support of low latency transmissions in sidelink as described herein. For example, the communications manager 1020 may include a resource pool manager 1025, a sidelink reservation manager 1030, a sidelink transmission manager 1035, a sidelink reception manager 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first UE in accordance with examples as disclosed herein. The resource pool manager 1025 may be configured as or otherwise support a means for receiving control signaling indicating a set of resource pools available for sidelink communications. The sidelink reservation manager 1030 may be configured as or otherwise support a means for transmitting an SCI message indicating a reservation of a resource pool of the set of resource pools, where the reservation indicates a priority level associated with low latency data, and where the priority level is based on a delay budget associated with the low latency data. The sidelink transmission manager 1035 may be configured as or otherwise support a means for transmitting, to a second UE via the resource pool, a sidelink message including the low latency data.

Additionally, or alternatively, the communications manager 1020 may support wireless communications at a second UE in accordance with examples as disclosed herein. The resource pool manager 1025 may be configured as or otherwise support a means for receiving control signaling indicating a set of resource pools available for sidelink communications. The sidelink reservation manager 1030 may be configured as or otherwise support a means for receiving, from a first UE, an SCI message indicating a reservation of a resource pool of the set of resource pools, where the reservation indicates a priority level associated with low latency data, and where the priority level is based on a delay budget associated with the low latency data. The sidelink reception manager 1040 may be configured as or otherwise support a means for transmitting, from the first UE via the resource pool, a sidelink message including the low latency data.

Figure 11:
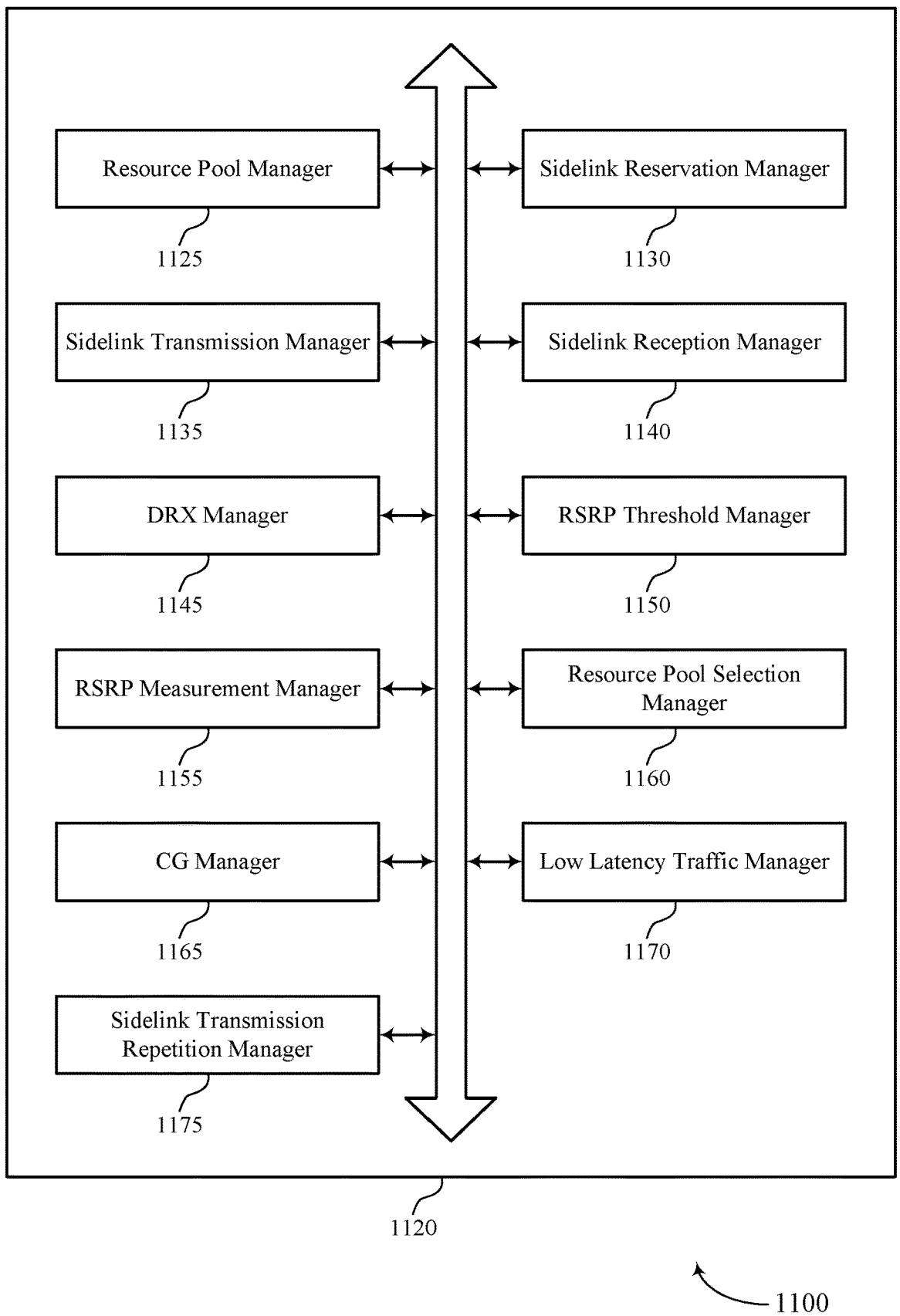
FIG. 11 shows a block diagram of a communications manager that supports low latency transmissions in sidelink in accordance with one or more aspects of the present disclosure.

FIG. 11 shows a block diagram 1100 of a communications manager 1120 that supports low latency transmissions in sidelink in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of support of low latency transmissions in sidelink as described herein. For example, the communications manager 1120 may include a resource pool manager 1125, a sidelink reservation manager 1130, a sidelink transmission manager 1135, a sidelink reception manager 1140, a DRX manager 1145, an RSRP threshold manager 1150, an RSRP measurement manager 1155, a resource pool selection manager 1160, a CG manager 1165, a low latency traffic manager 1170, a sidelink transmission repetition manager 1175, or any combination thereof. Each of these components may communicate, directly or indirectly, with one another (e.g., via one or more buses).

The communications manager 1120 may support wireless communications at a first UE in accordance with examples as disclosed herein. The resource pool manager 1125 may be configured as or otherwise support a means for receiving control signaling indicating a set of resource pools available for sidelink communications. The sidelink reservation manager 1130 may be configured as or otherwise support a means for transmitting an SCI message indicating a reservation of a resource pool of the set of resource pools, where the reservation indicates a priority level associated with low latency data, and where the priority level is based on a delay budget associated with the low latency data. The sidelink transmission manager 1135 may be configured as or otherwise support a means for transmitting, to a second UE via the resource pool, a sidelink message including the low latency data.

In some examples, the sidelink reservation manager 1130 may be configured as or otherwise support a means for receiving, from a third UE and prior to transmitting the SCI message, second control signaling indicating a second reservation of the resource pool, where the second reservation indicates a second priority level lower that the priority level, and where transmitting the SCI message is based on the second priority level being lower than the priority level.

In some examples, the DRX manager 1145 may be configured as or otherwise support a means for transmitting, to the second UE, second control signaling indicating an offset to apply to a DRX cycle for XR traffic, where the low latency data includes XR traffic.

In some examples, the DRX manager 1145 may be configured as or otherwise support a means for receiving, from a network entity, an indication of the offset.

In some examples, the RSRP threshold manager 1150 may be configured as or otherwise support a means for receiving second control signaling indicating a RSRP threshold associated with low latency traffic. In some examples, the RSRP measurement manager 1155 may be configured as or otherwise support a means for measuring RSRPs of reference signals associated with resource pools of the set of resource pools. In some examples, the resource pool selection manager 1160 may be configured as or otherwise support a means for selecting the resource pool based on a measured RSRP of a reference signal associated with the resource pool satisfying the RSRP threshold associated with low latency traffic.

In some examples, the RSRP threshold manager 1150 may be configured as or otherwise support a means for transmitting, to the second UE, second control signaling indicating a RSRP threshold associated with low latency traffic.

In some examples, the CG manager 1165 may be configured as or otherwise support a means for receiving second control signaling indicating a subset of the set of resource pools associated with configured grants for low latency traffic. In some examples, the low latency traffic manager 1170 may be configured as or otherwise support a means for communicating, with the second UE, low latency traffic via the subset.

In some examples, the low latency traffic manager 1170 may be configured as or otherwise support a means for receiving, from a network entity, an indication that the resource pool is associated with low latency traffic during a time interval, where the sidelink message is transmitted during the time interval.

In some examples, the DRX manager 1145 may be configured as or otherwise support a means for receiving, with the control signaling, an indication of a sub resource pool of the resource pool associated with XR traffic and a DRX cycle associated with the sub resource pool.

In some examples, to support transmitting the sidelink message, the sidelink transmission repetition manager 1175 may be configured as or otherwise support a means for repeating transmission of the sidelink message via a set of multiple sub resource pools of the resource pool.

In some examples, the sidelink transmission repetition manager 1175 may be configured as or otherwise support a means for receiving second control signaling indicating a repetition pattern for low latency traffic across subslots, where transmitting the sidelink message includes repeating transmission of the sidelink message across a set of subslots of the resource pool.

In some examples, the low latency traffic manager 1170 may be configured as or otherwise support a means for receiving, from the second UE or a third UE, second control signaling indicating that the resource pool is associated with low latency traffic, where transmitting the SCI message is based on the second control signaling.

In some examples, the sidelink transmission repetition manager 1175 may be configured as or otherwise support a means for repeating transmission of the sidelink message across multiple resource pools of the set of resource pools, where the SCI message indicates a second reservation of the multiple resource pools.

Additionally, or alternatively, the communications manager 1120 may support wireless communications at a second UE in accordance with examples as disclosed herein. In some examples, the resource pool manager 1125 may be configured as or otherwise support a means for receiving control signaling indicating a set of resource pools available for sidelink communications. In some examples, the sidelink reservation manager 1130 may be configured as or otherwise support a means for receiving, from a first UE, an SCI message indicating a reservation of a resource pool of the set of resource pools, where the reservation indicates a priority level associated with low latency data, and where the priority level is based on a delay budget associated with the low latency data. The sidelink reception manager 1140 may be configured as or otherwise support a means for transmitting, from the first UE via the resource pool, a sidelink message including the low latency data.

In some examples, the sidelink reservation manager 1130 may be configured as or otherwise support a means for receiving, from a third UE and prior to receiving the SCI message, second control signaling indicating a second reservation of the resource pool, where the second reservation indicates a second priority level lower that the priority level, and where receiving the SCI message is based on the second priority level being lower than the priority level.

In some examples, the DRX manager 1145 may be configured as or otherwise support a means for receiving, from the first UE, second control signaling indicating an offset to apply to a DRX cycle for XR traffic, where the low latency data includes XR traffic.

In some examples, the DRX manager 1145 may be configured as or otherwise support a means for receiving, from a network entity, an indication of an offset to apply to a DRX cycle for XR traffic, where the low latency data includes XR traffic.

In some examples, the RSRP threshold manager 1150 may be configured as or otherwise support a means for receiving, from the first UE, second control signaling indicating a RSRP threshold associated with low latency traffic.

In some examples, the CG manager 1165 may be configured as or otherwise support a means for receiving second control signaling indicating a subset of the set of resource pools associated with configured grants for low latency traffic. In some examples, the low latency traffic manager 1170 may be configured as or otherwise support a means for communicating, with the first UE, low latency traffic via the subset.

In some examples, the low latency traffic manager 1170 may be configured as or otherwise support a means for receiving, from a network entity, an indication that the resource pool is associated with low latency traffic during a time interval, where the sidelink message is received during the time interval.

In some examples, the DRX manager 1145 may be configured as or otherwise support a means for receiving, with the control signaling, an indication of a sub resource pool of the resource pool associated with XR traffic and a DRX cycle associated with the sub resource pool.

In some examples, to support receiving the sidelink message, the sidelink transmission repetition manager 1175 may be configured as or otherwise support a means for receiving repeated transmissions of the sidelink message via a set of multiple sub resource pools of the resource pool.

In some examples, the sidelink transmission repetition manager 1175 may be configured as or otherwise support a means for receiving second control signaling indicating a repetition pattern for low latency traffic across subslots, where receiving the sidelink message includes receiving repeated transmissions of the sidelink message across a set of subslots of the resource pool.

In some examples, the low latency traffic manager 1170 may be configured as or otherwise support a means for transmitting, to the first UE, second control signaling indicating that the resource pool is associated with low latency traffic, where transmitting the SCI message is based on the second control signaling.

In some examples, the sidelink transmission repetition manager 1175 may be configured as or otherwise support a means for receiving repeated transmissions of the sidelink message across multiple resource pools of the set of resource pools, where the SCI message indicates a second reservation of the multiple resource pools.

Figure 12:
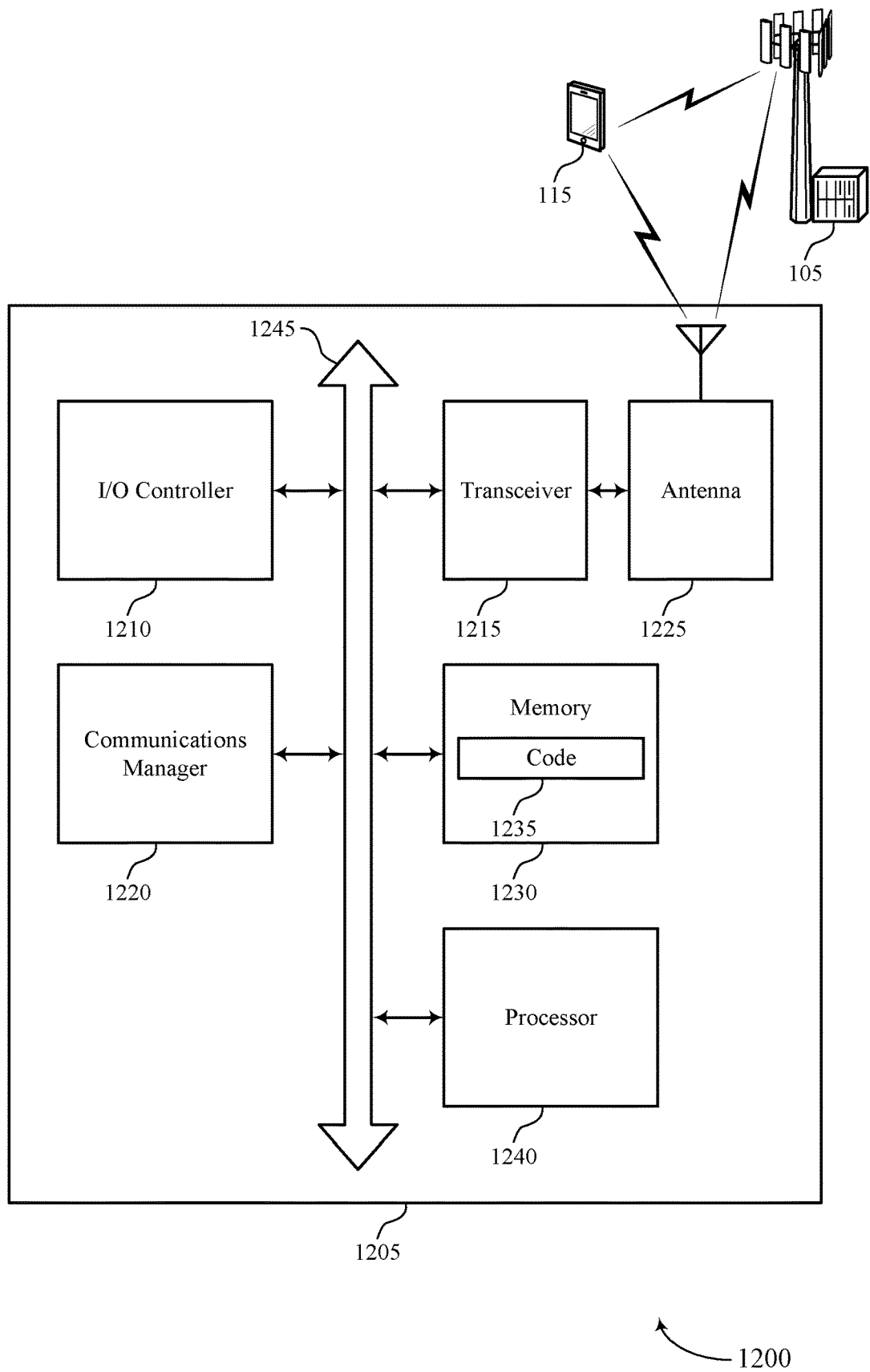
FIG. 12 shows a diagram of a system including a device that supports low latency transmissions in sidelink in accordance with one or more aspects of the present disclosure.

FIG. 12 shows a diagram of a system 1200 including a device 1205 that supports low latency transmissions in sidelink in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting support of low latency transmissions in sidelink). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a first UE in accordance with examples as disclosed herein. For example, the communications manager 1220 may be configured as or otherwise support a means for receiving control signaling indicating a set of resource pools available for sidelink communications. The communications manager 1220 may be configured as or otherwise support a means for transmitting an SCI message indicating a reservation of a resource pool of the set of resource pools, where the reservation indicates a priority level associated with low latency data, and where the priority level is based on a delay budget associated with the low latency data. The communications manager 1220 may be configured as or otherwise support a means for transmitting, to a second UE via the resource pool, a sidelink message including the low latency data.

Additionally, or alternatively, the communications manager 1220 may support wireless communications at a second UE in accordance with examples as disclosed herein. For example, the communications manager 1220 may be configured as or otherwise support a means for receiving control signaling indicating a set of resource pools available for sidelink communications. The communications manager 1220 may be configured as or otherwise support a means for receiving, from a first UE, an SCI message indicating a reservation of a resource pool of the set of resource pools, where the reservation indicates a priority level associated with low latency data, and where the priority level is based on a delay budget associated with the low latency data. The communications manager 1220 may be configured as or otherwise support a means for transmitting, from the first UE via the resource pool, a sidelink message including the low latency data.

By including or configuring the communications manager 1220 in accordance with examples as described herein, the device 1205 may support techniques for improved communication reliability, reduced latency, more efficient utilization of communication resources, improved coordination between devices, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of support of low latency transmissions in sidelink as described herein, or the processor 1240 and the memory 1230 may be otherwise configured to perform or support such operations.

Figure 13:
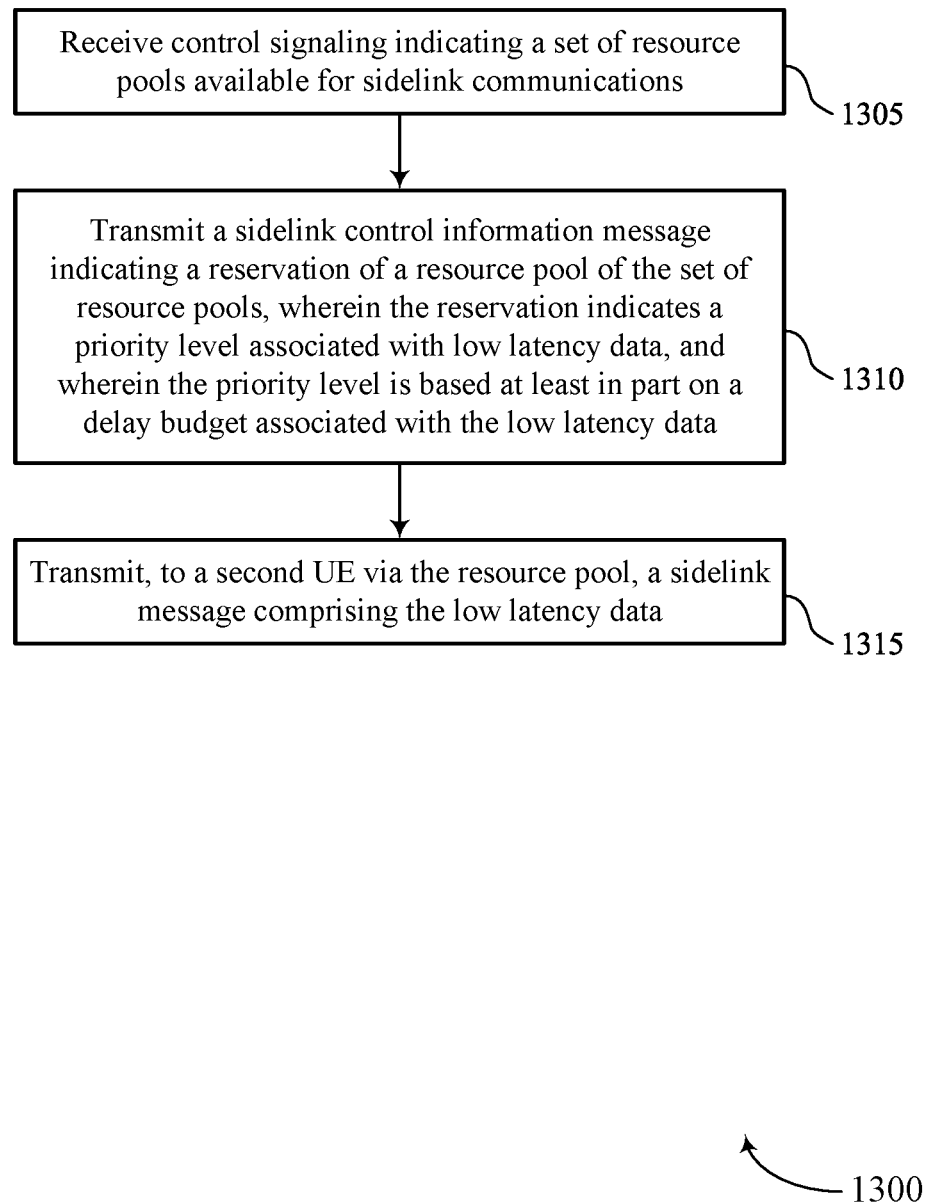
FIGS. 13 through 16 show flowcharts illustrating methods that support low latency transmissions in sidelink in accordance with one or more aspects of the present disclosure.

FIG. 13 shows a flowchart illustrating a method 1300 that supports low latency transmissions in sidelink in accordance with one or more aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating a set of resource pools available for sidelink communications. The operations of 1305 may be performed in accordance with examples as disclosed herein. In some examples, aspects of the operations of 1305 may be performed by a resource pool manager 1125 as described with reference to FIG. 11.

At 1310, the method may include transmitting an SCI message indicating a reservation of a resource pool of the set of resource pools, where the reservation indicates a priority level associated with low latency data, and where the priority level is based on a delay budget associated with the low latency data. The operations of 1310 may be performed in accordance with examples as disclosed herein. In some examples, aspects of the operations of 1310 may be performed by a sidelink reservation manager 1130 as described with reference to FIG. 11.

At 1315, the method may include transmitting, to a second UE via the resource pool, a sidelink message including the low latency data. The operations of 1315 may be performed in accordance with examples as disclosed herein. In some examples, aspects of the operations of 1315 may be performed by a sidelink transmission manager 1135 as described with reference to FIG. 11.

Figure 14:
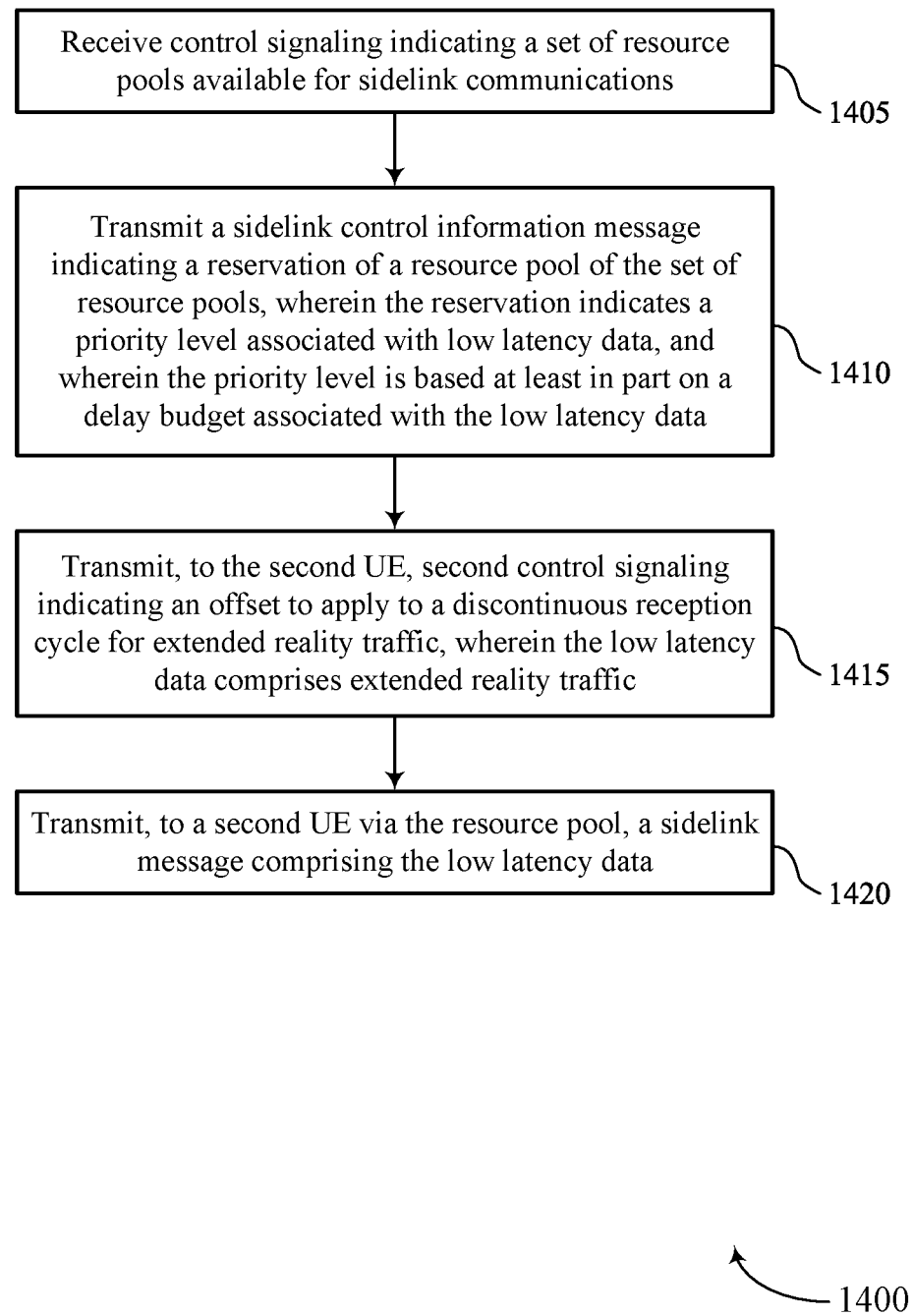

FIG. 14 shows a flowchart illustrating a method 1400 that supports low latency transmissions in sidelink in accordance with one or more aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating a set of resource pools available for sidelink communications. The operations of 1405 may be performed in accordance with examples as disclosed herein. In some examples, aspects of the operations of 1405 may be performed by a resource pool manager 1125 as described with reference to FIG. 11.

At 1410, the method may include transmitting an SCI message indicating a reservation of a resource pool of the set of resource pools, where the reservation indicates a priority level associated with low latency data, and where the priority level is based on a delay budget associated with the low latency data. The operations of 1410 may be performed in accordance with examples as disclosed herein. In some examples, aspects of the operations of 1410 may be performed by a sidelink reservation manager 1130 as described with reference to FIG. 11.

At 1415, the method may include transmitting, to the second UE, second control signaling indicating an offset to apply to a DRX cycle for XR traffic, where the low latency data includes XR traffic. The operations of 1415 may be performed in accordance with examples as disclosed herein. In some examples, aspects of the operations of 1415 may be performed by a DRX manager 1145 as described with reference to FIG. 11.

At 1420, the method may include transmitting, to a second UE via the resource pool, a sidelink message including the low latency data. The operations of 1420 may be performed in accordance with examples as disclosed herein. In some examples, aspects of the operations of 1420 may be performed by a sidelink transmission manager 1135 as described with reference to FIG. 11.

Figure 15:
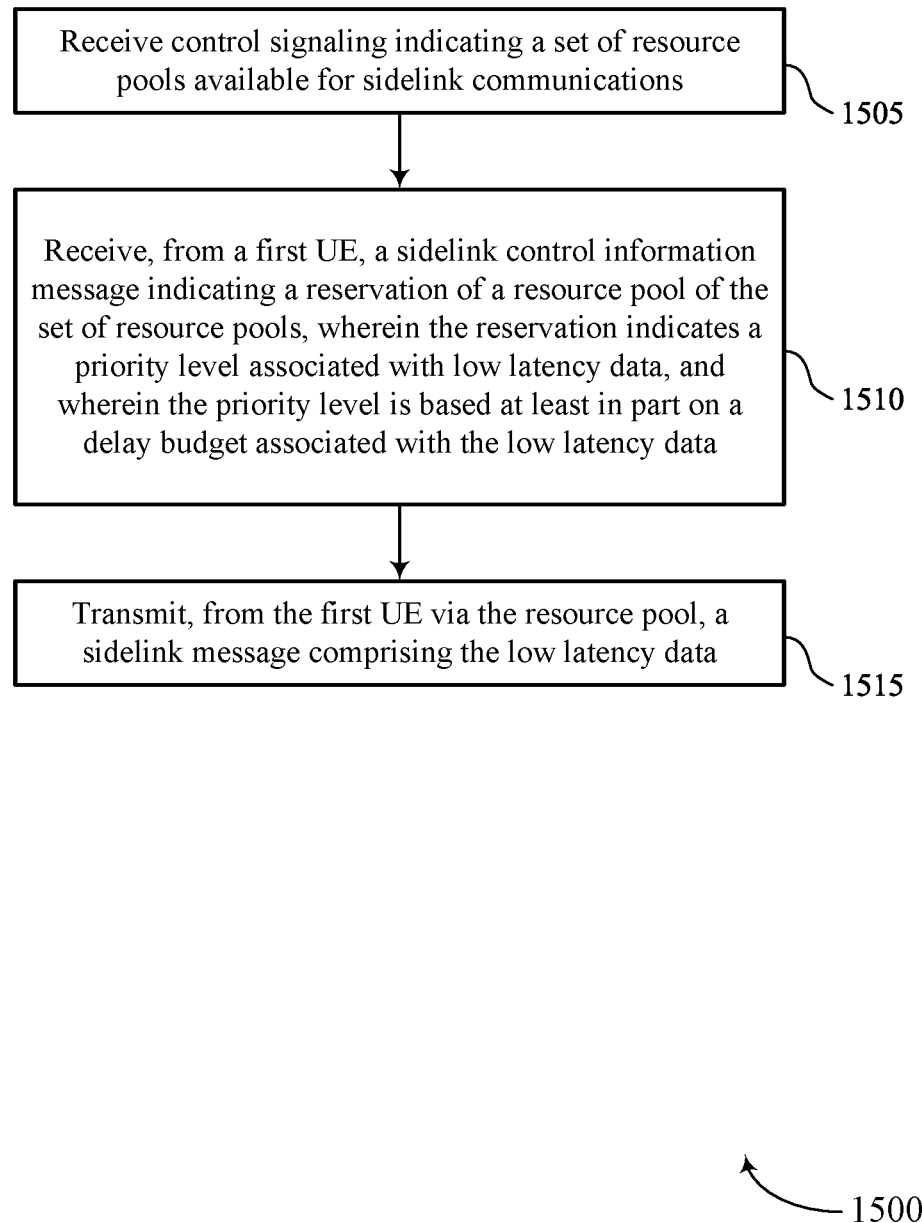

FIG. 15 shows a flowchart illustrating a method 1500 that supports low latency transmissions in sidelink in accordance with one or more aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating a set of resource pools available for sidelink communications. The operations of 1505 may be performed in accordance with examples as disclosed herein. In some examples, aspects of the operations of 1505 may be performed by a resource pool manager 1125 as described with reference to FIG. 11.

At 1510, the method may include receiving, from a first UE, an SCI message indicating a reservation of a resource pool of the set of resource pools, where the reservation indicates a priority level associated with low latency data, and where the priority level is based on a delay budget associated with the low latency data. The operations of 1510 may be performed in accordance with examples as disclosed herein. In some examples, aspects of the operations of 1510 may be performed by a sidelink reservation manager 1130 as described with reference to FIG. 11.

At 1515, the method may include transmitting, from the first UE via the resource pool, a sidelink message including the low latency data. The operations of 1515 may be performed in accordance with examples as disclosed herein. In some examples, aspects of the operations of 1515 may be performed by a sidelink reception manager 1140 as described with reference to FIG. 11.

Figure 16:
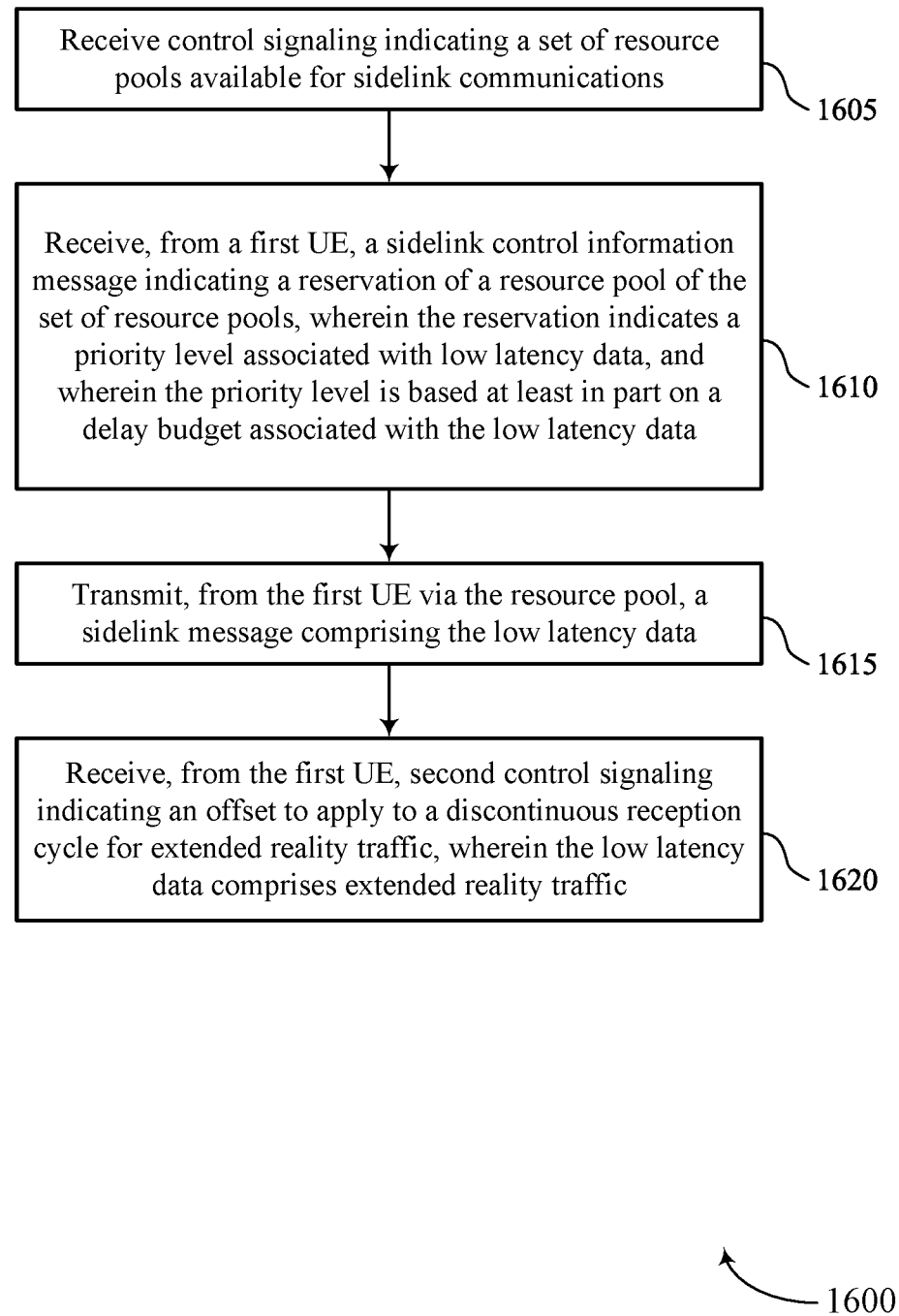

FIG. 16 shows a flowchart illustrating a method 1600 that supports low latency transmissions in sidelink in accordance with one or more aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1605, the method may include receiving control signaling indicating a set of resource pools available for sidelink communications. The operations of 1605 may be performed in accordance with examples as disclosed herein. In some examples, aspects of the operations of 1605 may be performed by a resource pool manager 1125 as described with reference to FIG. 11.

At 1610, the method may include receiving, from a first UE, an SCI message indicating a reservation of a resource pool of the set of resource pools, where the reservation indicates a priority level associated with low latency data, and where the priority level is based on a delay budget associated with the low latency data. The operations of 1610 may be performed in accordance with examples as disclosed herein. In some examples, aspects of the operations of 1610 may be performed by a sidelink reservation manager 1130 as described with reference to FIG. 11.

At 1615, the method may include transmitting, from the first UE via the resource pool, a sidelink message including the low latency data. The operations of 1615 may be performed in accordance with examples as disclosed herein. In some examples, aspects of the operations of 1615 may be performed by a sidelink reception manager 1140 as described with reference to FIG. 11.

At 1620, the method may include receiving, from the first UE, second control signaling indicating an offset to apply to a DRX cycle for XR traffic, where the low latency data includes XR traffic. The operations of 1620 may be performed in accordance with examples as disclosed herein. In some examples, aspects of the operations of 1620 may be performed by a DRX manager 1145 as described with reference to FIG. 11.

The following provides an overview of aspects of the present disclosure:

Aspect 1: A method for wireless communications at a first UE, comprising: receiving control signaling indicating a set of resource pools available for sidelink communications; transmitting a SCI message indicating a reservation of a resource pool of the set of resource pools, wherein the reservation indicates a priority level associated with low latency data, and wherein the priority level is based at least in part on a delay budget associated with the low latency data; and transmitting, to a second UE via the resource pool, a sidelink message comprising the low latency data.

Aspect 2: The method of aspect 1, further comprising: receiving, from a third UE and prior to transmitting the SCI message, second control signaling indicating a second reservation of the resource pool, wherein the second reservation indicates a second priority level lower that the priority level, and wherein transmitting the SCI message is based at least in part on the second priority level being lower than the priority level.

Aspect 3: The method of any of aspects 1 through 2, further comprising: transmitting, to the second UE, second control signaling indicating an offset to apply to a DRX cycle for XR traffic, wherein the low latency data comprises XR traffic.

Aspect 4: The method of aspect 3, further comprising: receiving, from a network entity, an indication of the offset.

Aspect 5: The method of any of aspects 1 through 4, further comprising: receiving second control signaling indicating a RSRP threshold associated with low latency traffic; measuring RSRPs of reference signals associated with resource pools of the set of resource pools; and selecting the resource pool based at least in part on a measured RSRP of a reference signal associated with the resource pool satisfying the RSRP threshold associated with low latency traffic.

Aspect 6: The method of any of aspects 1 through 5, further comprising: transmitting, to the second UE, second control signaling indicating a RSRP threshold associated with low latency traffic.

Aspect 7: The method of any of aspects 1 through 6, further comprising: receiving second control signaling indicating a subset of the set of resource pools associated with configured grants for low latency traffic; and communicating, with the second UE, low latency traffic via the subset.

Aspect 8: The method of any of aspects 1 through 7, further comprising: receiving, from a network entity, an indication that the resource pool is associated with low latency traffic during a time interval, wherein the sidelink message is transmitted during the time interval.

Aspect 9: The method of any of aspects 1 through 8, further comprising: receiving, with the control signaling, an indication of a sub resource pool of the resource pool associated with XR traffic and a DRX cycle associated with the sub resource pool.

Aspect 10: The method of any of aspects 1 through 9, wherein transmitting the sidelink message comprises: repeating transmission of the sidelink message via a plurality of sub resource pools of the resource pool.

Aspect 11: The method of any of aspects 1 through 10, further comprising: receiving second control signaling indicating a repetition pattern for low latency traffic across subslots, wherein transmitting the sidelink message comprises repeating transmission of the sidelink message across a set of subslots of the resource pool.

Aspect 12: The method of any of aspects 1 through 11, further comprising: receiving, from the second UE or a third UE, second control signaling indicating that the resource pool is associated with low latency traffic, wherein transmitting the SCI message is based at least in part on the second control signaling.

Aspect 13: The method of any of aspects 1 through 12, further comprising: repeating transmission of the sidelink message across multiple resource pools of the set of resource pools, wherein the SCI message indicates a second reservation of the multiple resource pools.

Aspect 14: A method for wireless communications at a second UE, comprising: receiving control signaling indicating a set of resource pools available for sidelink communications; receiving, from a first UE, a SCI message indicating a reservation of a resource pool of the set of resource pools, wherein the reservation indicates a priority level associated with low latency data, and wherein the priority level is based at least in part on a delay budget associated with the low latency data; and transmitting, from the first UE via the resource pool, a sidelink message comprising the low latency data.

Aspect 15: The method of aspect 14, further comprising: receiving, from a third UE and prior to receiving the SCI message, second control signaling indicating a second reservation of the resource pool, wherein the second reservation indicates a second priority level lower that the priority level, and wherein receiving the SCI message is based at least in part on the second priority level being lower than the priority level.

Aspect 16: The method of any of aspects 14 through 15, further comprising: receiving, from the first UE, second control signaling indicating an offset to apply to a DRX cycle for XR traffic, wherein the low latency data comprises XR traffic.

Aspect 17: The method of any of aspects 14 through 16, further comprising: receiving, from a network entity, an indication of an offset to apply to a DRX cycle for XR traffic, wherein the low latency data comprises XR traffic.

Aspect 18: The method of any of aspects 14 through 17, further comprising: receiving, from the first UE, second control signaling indicating a RSRP threshold associated with low latency traffic.

Aspect 19: The method of any of aspects 14 through 18, further comprising: receiving second control signaling indicating a subset of the set of resource pools associated with configured grants for low latency traffic; and communicating, with the first UE, low latency traffic via the subset.

Aspect 20: The method of any of aspects 14 through 19, further comprising: receiving, from a network entity, an indication that the resource pool is associated with low latency traffic during a time interval, wherein the sidelink message is received during the time interval.

Aspect 21: The method of any of aspects 14 through 20, further comprising: receiving, with the control signaling, an indication of a sub resource pool of the resource pool associated with XR traffic and a DRX cycle associated with the sub resource pool.

Aspect 22: The method of any of aspects 14 through 21, wherein receiving the sidelink message comprises: receiving repeated transmissions of the sidelink message via a plurality of sub resource pools of the resource pool.

Aspect 23: The method of any of aspects 14 through 22, further comprising: receiving second control signaling indicating a repetition pattern for low latency traffic across subslots, wherein receiving the sidelink message comprises receiving repeated transmissions of the sidelink message across a set of subslots of the resource pool.

Aspect 24: The method of any of aspects 14 through 23, further comprising: transmitting, to the first UE, second control signaling indicating that the resource pool is associated with low latency traffic, wherein transmitting the SCI message is based at least in part on the second control signaling.

Aspect 25: The method of any of aspects 14 through 24, further comprising: receiving repeated transmissions of the sidelink message across multiple resource pools of the set of resource pools, wherein the SCI message indicates a second reservation of the multiple resource pools.

Aspect 26: An apparatus for wireless communications at a first UE, comprising a processor; memory coupled with the processor; and instructions stored in the memory and executable by the processor to cause the apparatus to perform a method of any of aspects 1 through 13.

Aspect 27: An apparatus for wireless communications at a first UE, comprising at least one means for performing a method of any of aspects 1 through 13.

Aspect 28: A non-transitory computer-readable medium storing code for wireless communications at a first UE, the code comprising instructions executable by a processor to perform a method of any of aspects 1 through 13.

Aspect 29: An apparatus for wireless communications at a second UE, comprising a processor; memory coupled with the processor; and instructions stored in the memory and executable by the processor to cause the apparatus to perform a method of any of aspects 14 through 25.

Aspect 30: An apparatus for wireless communications at a second UE, comprising at least one means for performing a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
   one or more processors;
   one or more memories coupled with the one or more processors; and
   instructions stored in the one or more memories and executable by the one or more processors to cause the apparatus to:
   receive control signaling indicating a set of resource pools available for sidelink communications;
   transmit a sidelink control information message indicating a reservation of a resource pool of the set of resource pools, wherein the reservation indicates a priority level associated with low latency data, wherein the priority level preempts one or more lower priority level reservations of the resource pool, wherein the priority level is based at least in part on a remaining delay budget associated with the low latency data being less than a threshold, and wherein the remaining delay budget is based at least in part on a sidelink air interface delay;
   receive, from a third UE and prior to transmitting the sidelink control information message, third control signaling indicating a second reservation of the resource pool, wherein the second reservation indicates a second priority level lower than the priority level, and wherein transmitting the sidelink control information message that indicates the reservation of the resource pool is based at least in part on the second priority level being lower than the priority level; and
   transmit, to a second UE via the resource pool, a sidelink message comprising the low latency data.

2. The apparatus of claim 1, wherein the instructions are further executable by the one or more processors to cause the apparatus to:
   transmit, to the second UE, second control signaling indicating an offset to apply to a discontinuous reception cycle for extended reality traffic, wherein the low latency data comprises extended reality traffic.

3. The apparatus of claim 2, wherein the instructions are further executable by the one or more processors to cause the apparatus to:
   receive, from a network entity, an indication of the offset.

4. The apparatus of claim 1, wherein the instructions are further executable by the one or more processors to cause the apparatus to:
   receive second control signaling indicating a reference signal received power threshold associated with low latency traffic;
   measure reference signal received powers of reference signals associated with resource pools of the set of resource pools; and
   select the resource pool based at least in part on a measured reference signal received power of a reference signal associated with the resource pool satisfying the reference signal received power threshold associated with low latency traffic.

5. The apparatus of claim 1, wherein the instructions are further executable by the one or more processors to cause the apparatus to:
   transmit, to the second UE, second control signaling indicating a reference signal received power threshold associated with low latency traffic.

6. The apparatus of claim 1, wherein the instructions are further executable by the one or more processors to cause the apparatus to:
   receive second control signaling indicating a subset of the set of resource pools associated with configured grants for low latency traffic; and
   communicate, with the second UE, low latency traffic via the subset.

7. The apparatus of claim 1, wherein the instructions are further executable by the one or more processors to cause the apparatus to:
   receive, from a network entity, an indication that the resource pool is associated with low latency traffic during a time interval, wherein the sidelink message is transmitted during the time interval.

8. The apparatus of claim 1, wherein the instructions are further executable by the one or more processors to cause the apparatus to:
   receive, with the control signaling, an indication of a sub resource pool of the resource pool associated with extended reality traffic and a discontinuous reception cycle associated with the sub resource pool.

9. The apparatus of claim 1, wherein the instructions to transmit the sidelink message are executable by the one or more processors to cause the apparatus to:
   repeat transmission of the sidelink message via a plurality of sub resource pools of the resource pool.

10. The apparatus of claim 1, wherein the instructions are further executable by the one or more processors to cause the apparatus to:
    receive second control signaling indicating a repetition pattern for low latency traffic across subslots, wherein transmitting the sidelink message comprises repeating transmission of the sidelink message across a set of subslots of the resource pool.

11. The apparatus of claim 1, wherein the instructions are further executable by the one or more processors to cause the apparatus to:
    receive, from the second UE or a third UE, second control signaling indicating that the resource pool is associated with low latency traffic, wherein transmitting the sidelink control information message is based at least in part on the second control signaling.

12. The apparatus of claim 1, wherein the instructions are further executable by the one or more processors to cause the apparatus to:

repeat transmission of the sidelink message across multiple resource pools of the set of resource pools, wherein the sidelink control information message indicates a second reservation of the multiple resource pools.

13. The apparatus of claim 1, wherein the sidelink control information message includes an extended reality traffic indication that reserves future slots for extended reality traffic and disallows other types of traffic from being assigned to the future slots.

14. An apparatus for wireless communications at a second user equipment (UE), comprising:
one or more processors;
one or more memories coupled with the one or more processors; and
instructions stored in the one or more memories and executable by the one or more processors to cause the apparatus to:
receive control signaling indicating a set of resource pools available for sidelink communications;
receive, from a first UE, a sidelink control information message indicating a reservation of a resource pool of the set of resource pools, wherein the reservation indicates a priority level associated with low latency data, wherein the priority level preempts one or more lower priority level reservations of the resource pool, wherein the priority level is based at least in part on a remaining delay budget associated with the low latency data being less than a threshold, and wherein the remaining delay budget is based at least in part on a sidelink air interface delay;
receive, from a third UE and prior to receiving the sidelink control information message, third control signaling indicating a second reservation of the resource pool, wherein the second reservation indicates a second priority level lower than the priority level, and wherein receiving the sidelink control information message that indicates the reservation of the resource pool is based at least in part on the second priority level being lower than the priority level; and
receive, from the first UE via the resource pool, a sidelink message comprising the low latency data.

15. The apparatus of claim 14, wherein the instructions are further executable by the one or more processors to cause the apparatus to:
receive, from the first UE, second control signaling indicating an offset to apply to a discontinuous reception cycle for extended reality traffic, wherein the low latency data comprises extended reality traffic.

16. The apparatus of claim 14, wherein the instructions are further executable by the one or more processors to cause the apparatus to:
receive, from a network entity, an indication of an offset to apply to a discontinuous reception cycle for extended reality traffic, wherein the low latency data comprises extended reality traffic.

17. The apparatus of claim 14, wherein the instructions are further executable by the one or more processors to cause the apparatus to:
receive, from the first UE, second control signaling indicating a reference signal received power threshold associated with low latency traffic.

18. The apparatus of claim 14, wherein the instructions are further executable by the one or more processors to cause the apparatus to:
receive second control signaling indicating a subset of the set of resource pools associated with configured grants for low latency traffic; and
communicate, with the first UE, low latency traffic via the subset.

19. The apparatus of claim 14, wherein the instructions are further executable by the one or more processors to cause the apparatus to:
receive, from a network entity, an indication that the resource pool is associated with low latency traffic during a time interval, wherein the sidelink message is received during the time interval.

20. The apparatus of claim 14, wherein the instructions are further executable by the one or more processors to cause the apparatus to:
receive, with the control signaling, an indication of a sub resource pool of the resource pool associated with extended reality traffic and a discontinuous reception cycle associated with the sub resource pool.

21. The apparatus of claim 14, wherein the instructions to receive the sidelink message are executable by the one or more processors to cause the apparatus to:
receive repeated transmissions of the sidelink message via a plurality of sub resource pools of the resource pool.

22. The apparatus of claim 14, wherein the instructions are further executable by the one or more processors to cause the apparatus to:
receive second control signaling indicating a repetition pattern for low latency traffic across subslots, wherein receiving the sidelink message comprises receiving repeated transmissions of the sidelink message across a set of subslots of the resource pool.

23. The apparatus of claim 14, wherein the instructions are further executable by the one or more processors to cause the apparatus to:
transmit, to the first UE, second control signaling indicating that the resource pool is associated with low latency traffic, wherein transmitting the sidelink control information message is based at least in part on the second control signaling.

24. The apparatus of claim 14, wherein the instructions are further executable by the one or more processors to cause the apparatus to:
receive repeated transmissions of the sidelink message across multiple resource pools of the set of resource pools, wherein the sidelink control information message indicates a second reservation of the multiple resource pools.

25. A method for wireless communications at a first user equipment (UE), comprising:
receiving control signaling indicating a set of resource pools available for sidelink communications;
transmitting a sidelink control information message indicating a reservation of a resource pool of the set of resource pools, wherein the reservation indicates a priority level associated with low latency data, wherein the priority level preempts one or more lower priority level reservations of the resource pool, wherein the priority level is based at least in part on a remaining delay budget associated with the low latency data being less than a threshold, and wherein the remaining delay budget is based at least in part on a sidelink air interface delay;
receiving, from a third UE and prior to transmitting the sidelink control information message, third control signaling indicating a second reservation of the resource pool, wherein the second reservation indicates a second priority level lower than the priority level, and wherein transmitting the sidelink control information message that indicates the reservation of the resource pool is based at least in part on the second priority level being lower than the priority level; and transmitting, to a second UE via the resource pool, a sidelink message comprising the low latency data.

26. The method of claim 25, further comprising:

transmitting, to the second UE, second control signaling indicating an offset to apply to a discontinuous reception cycle for extended reality traffic, wherein the low latency data comprises extended reality traffic.

27. A method for wireless communications at a second user equipment (UE), comprising:

receiving control signaling indicating a set of resource pools available for sidelink communications;

receiving, from a first UE, a sidelink control information message indicating a reservation of a resource pool of the set of resource pools, wherein the reservation indicates a priority level associated with low latency data, wherein the priority level preempts one or more lower priority level reservations of the resource pool, wherein the priority level is based at least in part on a remaining delay budget associated with the low latency data being less than a threshold, and wherein the remaining delay budget is based at least in part on a sidelink air interface delay;

receiving, from a third UE and prior to receiving the sidelink control information message, third control signaling indicating a second reservation of the resource pool, wherein the second reservation indicates a second priority level lower than the priority level, and wherein receiving the sidelink control information message that indicates the reservation of the resource pool is based at least in part on the second priority level being lower than the priority level; and receiving, from the first UE via the resource pool, a sidelink message comprising the low latency data.

* * * * *